United States Patent
Lagerblad et al.

(10) Patent No.: US 10,592,588 B2
(45) Date of Patent: *Mar. 17, 2020

(54) SEMANTIC DISTANCE-BASED ASSIGNMENT OF DATA ELEMENTS TO VISUALIZATION EDGES

(71) Applicant: Oracle International Corporation, Redwood Shores, CA (US)

(72) Inventors: Bo Jonas Birger Lagerblad, Palo Alto, CA (US); Alvin Andrew Raj, Woburn, MA (US); Samuel Stephen Dyar, Miami, FL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,567

(22) Filed: May 3, 2018

(65) Prior Publication Data

US 2018/0260365 A1    Sep. 13, 2018

Related U.S. Application Data

(63) Continuation of application No. 14/866,272, filed on Sep. 25, 2015, now Pat. No. 9,971,742.

(Continued)

(51) Int. Cl.
*G06F 17/21* (2006.01)
*G06F 16/904* (2019.01)
*G06F 3/0484* (2013.01)

(52) U.S. Cl.
CPC ........ *G06F 17/212* (2013.01); *G06F 3/04842* (2013.01); *G06F 3/04847* (2013.01); *G06F 16/904* (2019.01)

(58) Field of Classification Search
CPC .. G06F 17/212; G06F 16/904; G06F 3/04842; G06F 3/04847
See application file for complete search history.

(56) References Cited

U.S. PATENT DOCUMENTS 9,824,470 B2    11/2017    Kuo
9,933,928 B2    4/2018    Mackinlay et al.
(Continued)

FOREIGN PATENT DOCUMENTS

JP    0476679    3/1992
JP    07302347    11/1995
(Continued)

OTHER PUBLICATIONS

U.S. Appl. No. 14/865,249, Final Office Action dated Mar. 8, 2019, 27 pages.
(Continued)

*Primary Examiner* — Chong Wu
(74) *Attorney, Agent, or Firm* — Kilpatrick Townsend & Stockton LLP

(57) ABSTRACT

Embodiments provide a visual analyzer system that can update an existing visualization upon receiving a user request to modify a dimension of data being presented by the visualization. Embodiments may provide an updated visualization, possibly of a different visualization type and/or with pre-existing dimensions mapped to different edges, without requiring any user specification of which dimensions to be mapped to which edges of the visualization. The system can determine configurations for the various visualization types and compute, for each configuration, a visualization score. Based on the scores, the system can select a configuration and render the updated visualization on a graphical user interface (GUI) to the user. Further, in response to user specification to change a representation of data from one visualization type to another, embodiments may determine an effective and intuitive manner in which to present the same set of data in the visualization of the other type.

20 Claims, 20 Drawing Sheets

Related U.S. Application Data

(60) Provisional application No. 62/056,404, filed on Sep. 26, 2014, provisional application No. 62/079,363, filed on Nov. 13, 2014.

(56) References Cited

U.S. PATENT DOCUMENTS

| | | | |
|---|---|---|---|
| 9,971,742 B2 * | 5/2018 | Lagerblad | G06F 3/04842 |
| 2012/0303548 A1 | 11/2012 | Johnson et al. | |
| 2012/0313949 A1 | 12/2012 | Rope et al. | |
| 2013/0097177 A1 | 4/2013 | Fan et al. | |
| 2014/0108929 A1 | 4/2014 | Garmark et al. | |
| 2015/0278371 A1 | 10/2015 | Anand et al. | |
| 2016/0092408 A1 | 3/2016 | Lagerblad et al. | |
| 2016/0092530 A1 | 3/2016 | Jakubiak et al. | |

FOREIGN PATENT DOCUMENTS

| | | |
|---|---|---|
| JP | 2009508210 | 2/2009 |
| JP | 2011113564 | 6/2011 |
| JP | 2014056573 | 3/2014 |
| WO | 2013049084 | 4/2013 |
| WO | 2016049634 | 3/2016 |

OTHER PUBLICATIONS

Capitula, Tableau Essentials: Chart Types—Highlight Table, Interworks, Available Online at: https://interworks.com/blog/ccapitula/2014/08/06/tableau-essentials-chart-types-highlight-table, Aug. 6, 2014, pp. 1-8.

Japanese Application No. 2017-515145, Office Action dated Mar. 12, 2019, 6 pages (5 pages for the original document and 1 page for the English translation).

"Final Office Action" issued in U.S. Appl. No. 14/865,249, dated Feb. 22, 2018, 37 pages.

"Non-Final Office Action" issued in U.S. Appl. No. 14/865,249, dated Aug. 9, 2017, 14 pages.

"Non-Final Office Action" issued in U.S. Appl. No. 14/866,272, dated Jul. 13, 2017, 17 pages.

"Notice of Allowance" issued in U.S. Appl. No. 14/866,272, dated Jan. 22, 2018, 15 pages.

"International Preliminary Report on Patentability" issued in PCT/US2015/052661, dated Jan. 11, 2017, 8 pages.

"International Search Report and Written Opinion" issued in PCT/US2015/052661, dated Feb. 4, 2016, 11 pages.

"Written Opinion" issued in PCT/US2015/052661, dated Sep. 27, 2016, 7 pages.

Peltier Technical Services, Inc., "Highlighted Chart Source Data", Retrieved at https://peltiertech.com/highlighted-chart-source-data/, Published May 27, 2008, 13 pages.

Tibco Software Inc , "New Release Boosts Ease of Use Across the Entire Spotfire Platform", Available online at: http://spotfire.tibco.com, Apr. 14, 2016, 3 pages.

"Non-Final Office Action" issued in U.S. Appl. No. 14/865,249, dated Jul. 26, 2018, 38 pages.

U.S. Appl. No. 14/865,249, Advisory Action dated May 22, 2019, 3 pages.

Japanese Application No. 2017-515145, Notice of Decision to Grant dated Jun. 25, 2019, 5 pages (3 pages for the original document and 2 pages for the English translation).

U.S. Appl. No. 14/865,249, Notice of Allowance dated Nov. 14, 2019, 10 pages.

* cited by examiner

```
Pseudo-code:
edges have a list of tags defined on them, as well as a numerical priority.
MAX_PRIORITY <- maximum value of a priority across all edges
function computeEdgeSimilarity (edge1, edge2)
    return number of tags defined on both edge1 and edge2
function sortEdgesByBestMatch (queryEdge, arrayOfEdgesToCompare):
    for each edge in arrayOfEdgesToCompare:
        similarityScore = computeEdgeSimilarity(queryEdge, edge)
        priorityScore = edge.priority/MAX_PRIORITY
        overallMatchScore = similarityScore + priorityScore
    return arrayOfEdgesToCompare sorted by overallMatchScore
```

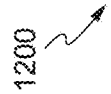

FIG. 12

SEMANTIC DISTANCE-BASED ASSIGNMENT OF DATA ELEMENTS TO VISUALIZATION EDGES

CROSS-REFERENCES TO RELATED APPLICATIONS

This application is continuation application and claims the benefit and priority of U.S. Non-Provisional application Ser. No. 14/866,272, filed on Sep. 25, 2015, titled "SEMANTIC DISTANCE-BASED ASSIGNMENT OF DATA ELEMENTS TO VISUALIZATION EDGES," U.S. Provisional Application No. 62/056,404, filed on Sep. 26, 2014, titled "SEMANTIC DISTANCE-BASED ASSIGNMENT OF DATA ELEMENTS TO VISUALIZATION EDGES," and U.S. Provisional Application No. 62/079,363, filed on Nov. 13, 2014, titled "VISUAL ANALYZER SYSTEM," both of which are herein incorporated by reference in their entirety for all purposes.

BACKGROUND

Generating graphic visualizations that can be readily intuitive to a user presents significant challenges as there are countless variations in which data can be assembled and presented to the user. For example, while a type of visualization (e.g., a bar chart, a pie chart) may accommodate multiple dimensions of data (e.g., revenue, company, year), changes in the values or the numbers of the dimensions of data to be presented by the visualization often cause the presentation of the data to be difficult for the user to understand, for example, due to the type of visualization used or the manner in which the dimensions are represented by the various edges of the visualization. Further, the user may desire to view a same set of data under different types of visualizations. As there are many variations in which various visualization types can present the same set of data, there is a need to be able to determine how to present the data using a desired visualization type and in a manner that would be intuitively understandable to the user.

SUMMARY

The present disclosure relates to visual analysis and more specifically to techniques for automating effective presentation of data using graphic visualizations. Certain embodiments are described that increase the effectiveness of a graphic visualization in presenting data to a user such that the data represented by the graphic visualization may be intuitive and quickly understandable by the user.

In certain embodiments, techniques (including systems, devices, methods, code or program instructions executed by one or more computer processors) are provided for effective presentation of data to a user using a graphic visualization. Some embodiments provide a visual analyzer system that can dynamically update an existing visualization upon receiving a user request to modify one or more dimensions of the data being presented by the visualization. In some embodiments, the user input can correspond to the addition to or a removal of a dimension of data from an existing visualization. In certain embodiments, the visual analyzer system can determine multiple configurations for multiple visualization types and compute, for each of those configurations, a distance score. Based on the computed distance scores, the visual analyzer system can select a configuration that has the highest score in some embodiments. The visualizer system may then automatically update the visualization to a type corresponding to the selected configuration and render the updated visualization to the user (e.g., without the user specifying an edge to use in representing a newly added dimension, in the instance where the user request is to add a new dimension). In some instances, the updated visualization may be of a different visualization type from the visualization type of the existing visualization, without user specification of the change in the visualization type. Embodiments incorporate the user's request for modification to the existing visualization while presenting the updated visualization in an effective and intuitive manner.

In some embodiments, the visual analyzer system can also present a same set of data in different visualization types as specified by the user while ensuring that the manner in which the same set of data is being presented using the desired visualization is effective and intuitive to the user. Some embodiments can receive user input corresponding to a request to change a visualization type of an existing visualization from a first, source visualization type to a second, target visualization type. For example, the user may desire to view the same set of data in a pie chart instead of a current presentation in a bar chart. The visual analyzer system may determine a first set of edges for the existing visualization that is of a first, source visualization type. Examples of an edge can include a row, column, category, values, color, shape, size, etc. In some embodiments, edges of a visualization can represent different dimensions of data, such as year, company name, type of product, etc. The visual analyzer system may also determine a second set of edges for a second, target visualization type. In certain embodiments, the visual analyzer system may then perform a mapping between the first set of edges to the second set of edges. In some embodiments, the mapping can include a distance determination between edges in the first set of edges and edges in the second set of edges. After the edges in the existing visualization is mapped to the edges in a target visualization, the visual analyzer system may then render the target visualization of the second, target visualization type with corresponding edge values. While the visualization type has been modified, the visual analyzer system presents the data in a target visualization with a target visualization type in a manner that is effective and intuitive to a user.

Some embodiments provide techniques (e.g., a method, a system, non-transitory computer-readable medium storing code or instructions executable by one or more processors) for effective presentation of data to a user using a graphic visualization. One such technique can include receiving input corresponding to a modification of an existing visualization, the modification including adding or removing a dimension of data to one or more dimensions associated with the existing visualization; determining a plurality of visualization configurations for a plurality of visualization types, the plurality of visualization configurations including the modification to the existing visualization; computing, by one or more processors, a plurality of configuration scores for the plurality of visualization configurations; selecting, based on the computed configuration scores, a particular visualization configuration from the plurality of visualization configurations; and causing an updated visualization corresponding to the particular visualization configuration to be rendered.

In some embodiments, computing the plurality of configuration scores includes determining a set of dimensions including the modification to the one or more dimensions and mapping each of the set of dimensions to an edge within a visualization configuration. In certain embodiments, a dimension is mapped to an edge when the mapping results in a higher value compared to the dimension being mapping to other edges within the visualization configuration. In some embodiments, the configuration scores for the visualization configurations are computed using a configuration scoring equation that includes a visualization goodness component, a preference component, a penalty component for switching visualizations, and a semantic difference component.

In some embodiments, the plurality of visualization types includes a visualization type specified by a user via a plugin adapter, the visualization type having one or more edges that can represent one or more dimensions specified by the user. In certain embodiments, a configuration score computed for a configuration accounts for the penalty component for switching visualizations, where the penalty component for switching visualizations assigns a higher penalty score for a change in a type of visualization from the existing visualization to another visualization compared to no change in the type of visualization from the existing visualization to the other visualization. In some embodiments, the updated visualization has a visualization type that is different from the existing visualization.

Some embodiments provide techniques (e.g., a method, a system, non-transitory computer-readable medium storing code or instructions executable by one or more processors) for presenting a same set of data in a visualization of another type in an effective and intuitive manner. One such technique can include receiving existing edge information for an existing visualization, the existing visualization having a first set of edges, where the first set of edges identifies that the existing visualization is of a first visualization type; receiving target edge information for a target visualization, the target visualization having a second set of edges, where the second set of edges identifies that the target visualization is of a second visualization type; and determining, using the existing edge information and the target edge information, a mapping between the first set of edges of the existing visualization and the second set of edges of the target visualization, where determining the mapping includes determining a distance between the edges of the visualizations.

While maintaining its existing edge-to-dimension mappings and its existing visualization type as much as possible, embodiments may determine and present the most intuitive representation of the dimensions without requiring the user to manually specify a change in the mappings or visualization type. Embodiments may automatically generate a series of configurations based on an existing configuration and a change to the visualization specified by the user (e.g., addition of a dimension, removal of a dimension, etc.) and score these configurations. The scoring may take into account a semantic difference that renders configurations with larger variations in edge-to-dimension mappings and in visualization types to have a lower score compared to configurations with smaller differences in edge-to-dimension mappings and in visualization types. Every manual adjustment by the user through the visual analyzer application (e.g., running via a Web browser or on a mobile device) would require interacting with data stored in a remote location (e.g., database) where the data is accessed via a data service, which is time consuming and inefficient. Eliminating the need for a user to continually perform a manual adjustment on the edge-to-dimension mappings and/or visualization types to achieve a desirable and intuitive representation of data in a data visualization can improve the efficiency of the system by saving overall processing time and lowering utilization of resources. This automatic, dynamic, and responsive determination of data representation can enable the user to achieve a desirable and intuitive visual representation quickly and reliably.

The foregoing, together with other features and embodiments will become more apparent upon referring to the following specification, claims, and accompanying drawings.

BRIEF DESCRIPTION OF THE DRAWINGS

FIG. 12 illustrates an example of pseudo-code for mapping the edges from a source visualization to a target visualization in accordance with some embodiments of the present invention.

DETAILED DESCRIPTION

Figure 1:
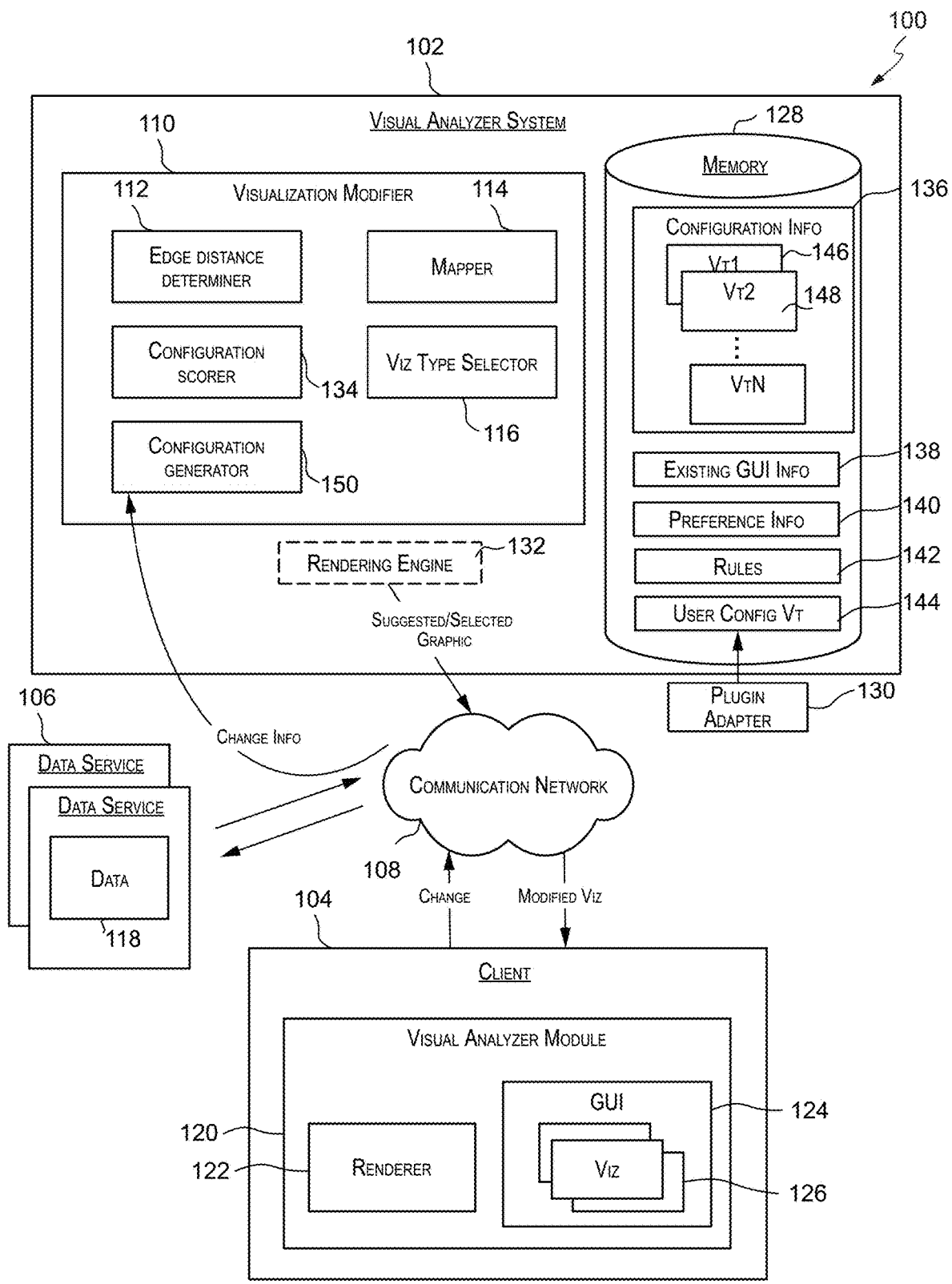
FIG. 1 illustrates an example block diagram of a computing environment in accordance with certain embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, techniques (including systems, devices, methods, code or program instructions executed by one or more computer processors) are provided for effective presentation of data to a user using a graphic visualization. Some embodiments provide a visual analyzer system that can update an existing visualization upon receiving a user request to modify one or more dimensions of the data being presented by the visualization. In some embodiments, the user input can correspond to the addition or a removal of a dimension of data to an existing visualization. In certain embodiments, the visual analyzer system can determine multiple configurations for the various visualization types and compute, for each of those configurations, a visualization score. Based on the computed visualization scores, the visual analyzer system can select a configuration that has the highest score in some embodiments. The visualizer system may then update the visualization to correspond to the selected configuration and render the updated visualization on a graphical user interface (GUI) to the user. In some instances, the updated visualization may be of a different visualization type from the visualization type of the existing visualization. These various embodiments can update an existing visualization in a way such that the updated visualization incorporating the user's request to add or remove a dimension is presented in an effective yet intuitive manner.

In some embodiments, the visual analyzer system can also present a same set of data in different visualization types as specified by the user while ensuring that the manner in which the same set of data is being presented using the desired visualization is effective and intuitive to the user. Some embodiments can receive user input corresponding to a request to change a visualization type of an existing visualization from a first, source visualization type to a second, target visualization type. For example, the user may desire to view the same set of data in a pie chart instead of a current presentation in a bar chart. The visual analyzer system may determine a first set of edges for the existing visualization that is of a first, source visualization type. Examples of an edge can include a row, column, category, values, color, shape, size, etc. In some embodiments, edges of a visualization can represent different dimensions of data, such as year, company name, type of product, etc. The visual analyzer system may also determine a second set of edges for a second, target visualization type. In certain embodiments, the visual analyzer system may then perform a mapping between the first set of edges to the second set of edges. In some embodiments, the mapping can include a distance determination between edges in the first set of edges and edges in the second set of edges. After the edges in the existing visualization is mapped to the edges in a target visualization, the visual analyzer system may then render the target visualization of the second, target visualization type with corresponding edge values. While the visualization type has been modified, the visual analyzer system presents the data in a target visualization with a target visualization type in a manner that is effective and intuitive to a user.

In some embodiments, a visual analyzer system can present one or more visualizations to a user via a visual analyzer application presented by a web browser (e.g., on a mobile device). In certain embodiments, a visualization is a visual representation of some data. In one embodiment, a visualization can display graphic elements, shapes and/or text. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc. The visual analyzer system may generate a visualization with multiple graphical attributes (also referred to as edges) that each correspond to a specified dimension. For example, a visual analyzer application can generate a bar chart with color, axis, size attributes that each corresponds to a dimension specified by a user such as time, sales, and entities. Each dimension may also have one or more dimension members, such as years 2009, 2010, 2011, company names X, Y, Z, and different types of products, etc.

Each visualization can include values for multiple dimensions of data from one or more columns in a database in some embodiments. A database can be a relational database that includes one or more tables. A table can have a set of rows and a set of columns. A dimension can correspond to a column of a table (or a database) while a record can correspond to a row of a table (or a database). In some embodiments, the visual analyzer application user interface (e.g., displayed through a web browser) can provide a projection of one or more databases. The user can identify one or more dimensions of data available in the one or more databases and request the visual analyzer application to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include row (also referred to as x-axis), column (also referred to as y-axis), category, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization.

In certain embodiments, adding or removing tags may simply affect how a column moves when transitioning between visualization types. In some embodiments, a list of functional tags per edge can include position, mark, x, y, row, column, radius, angle, text, color, shape, stack, inner, outer, datapoint. For each edge, a visualization can add whatever tags to denote how it chooses to use that edge. For example, in a scatter chart, the "color" edge can be tagged with "mark," "inner," "datapoint," and "color." In another example, in a bar chart, the "color" edge can be tagged with "mark," "inner," "datapoint," "color," and "column." Different edges for different visualization types may have different functional tags.

The visual analyzer system can generate one or more visualizations based on one or more dimensions of data specified by a user. For example, the user may specify multiple dimensions such as time, sales, and entities to be represented by a visualization. The visual analyzer system may then generate a visualization with multiple edges (also referred to as graphical attributes) that each correspond to a specified dimension. For example, a visual analyzer application can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

The numerous types of visualizations and the various ways how dimensions of data can be assigned to the different edges of a visualization enables the data to be displayed in many ways. Automatically determining how to assemble and present large amounts of data to a user that would be intuitive and quickly comprehendible to the user without requiring human interaction in specifying how to display the data in graphic visualizations is tremendously challenging. Further, even permitting a user to manipulate the manner in which dimensions are mapped to edges of a visualization may not allow the dimensions to be displayed in an effective and intuitive manner to most viewers. A user of a visual analyzer system may not be familiar with how to map the dimensions to the edges of the visualization to ensure that the presentation would appear to be easily understandable by others.

In various embodiments of the present invention, a hierarchical relationship graph can be generated for each visual representation. Upon receiving a user indication to add or remove a dimension for the visual representation, the visual analyzer system can generate one or more new configurations of the hierarchical relationship graph where each of the configurations represents a different visual representation. Some embodiments can score each of the multiple configurations of the hierarchical relationship graph generated using a visualization configuration algorithm. In some embodiments, the visual analyzer system then determines the configuration with the highest score and generates the visual representation corresponding to the configuration with the highest score. Accordingly, embodiments of the invention can provide effective visualizations that are easily understood by a user without requiring human intervention or interaction.

Embodiments present dimensions of data to a user such that the user can understand the data in an intuitive manner. In some embodiments, a current visualization can add a column (also referred to as a dimension) that the user desires to add. Some embodiments may determine whether the new dimension can be added and which edge to represent the new dimension based on whether the new dimension is a numerical (also referred to as value) type dimension or categorical type dimension. Numerical dimensions are dimensions that have numerical values. Category dimensions are dimensions that have discrete items such as things, names, offices, colors, etc.

As described, different visualization types may handle a different number of categorical columns and a different number of value columns. For instance, a scatterplot may only be able to handle up to four numerical columns to be distributed among the x-axis, the y-axis, a color graphical attribute, and a size graphical attribute. Embodiments may map the new column of data to an edge of the visualization so long as the visualization can add the new column that the user desires to add, e.g., if the visualization has additional edges that can consume the newly added column are available. Some embodiments may determine whether the visualization has additional edges that can consume the newly added columns based on data type compatibility (e.g., if the edge tag and the dimension type are numerical or categorical), and/or based on the number of dimension members that are in the newly added column and whether the edge can accommodate the number of dimension members.

In some embodiments, when determining which edge to map the newly added column, an algorithm may account for a semantic difference as it is not desirable to have the visualization look too different. If a column was represented by the x-axis, it is desirable to keep the column represented by the x-axis after adding the new column. In some embodiments, the visualization hierarchical tree structure may have a structural node that includes a row edge, a column edge, a detail edge, a values edge, and a presentation node that includes a color edge, a size edge, and a shape edge. Embodiments may minimize the semantic difference by keeping the columns represented by these different edges in the pre-existing visualization in edges that have similar characteristics (e.g., have the most overlapping tags between the edges) in the target visualization.

Some visualization types may not be capable of handling certain types of columns. For instance, glyph may not support the addition of a categorical column such as company or the addition of a numerical type data. Bar chart may not support a shape axis. In those instances when the user desires to add those types of columns (e.g., by dropping those column representations onto an axis that is not supported in a current visualization), the visual analyzer system may switch the visualization types.

Some embodiments try to keep the same visualization type as much as possible upon incorporating a change indicated by a user. But if the visualization is changed, then the system may try to minimize the amount of column-edge mappings that need to be moved. Embodiments provide a configuration scoring algorithm that can help determine what configuration of the data represented by which visualization type may be most intuitive and useful to the user. Vizgoodness scoring equation (also referred to as the base score algorithm) can take all the edges in the existing visualization and drop them onto all the possible visualizations to get a score. Even when a vizgoodness score for a particular configuration may be higher than another, if the semantic difference score indicating how much the edges had to be moved around is high, then the particular configuration may still be less desirable than the other (e.g., that might not have needed to move many if any columns/edges).

Further, the total score may be subtracted by difference between the original visualization and the new configuration of the visualization. As such, the change between visualizations may be minimized as large changes may have a higher score. Depending on the original visualization type, a transition score for switching to other visualization types may be different. For instance, if switching from horizontal to stat bar, a transition score may be determined to be not as large compared to switching to scatterplot. Different embodiments may account for different scoring components in determining the best column-edge mappings e.g., when a column is being added, when an existing column is being removed, or when a visualization type is being altered.

I. Example Computing Environment

FIG. 1 illustrates an example block diagram of a computing environment 100 in accordance with certain embodiments of the present invention. As shown, computing environment 100 includes visual analyzer system 102 communicatively coupled to client device 104 and one or more data services 106 via a communication network 108. The embodiment depicted in FIG. 1 is merely an example and is not intended to unduly limit the claimed embodiments of the present invention. One of ordinary skill in the art would recognize many variations, alternatives, and modifications. For example, visual analyzer system 102 can be part of client device 104 or can be running on one or more servers.

Client device 104 may be of various different types, including, but not limited to a personal computer, a desktop, a mobile or handheld device such as a laptop, a mobile phone, a tablet, etc., and other types of devices. The term "server" as used herein typically refers to an application that executes and operates as a server according to a client-server protocol. Some examples of servers include database servers, web servers, application servers, file servers, mail servers, print servers, gaming servers, etc. In some contexts, though, the term "server" may also refer to computing hardware that can or does execute a server application. However, the particular meaning of a use of the term "server" will be apparent to those of skill in the art based upon its context of use.

Communication network 108 facilitates communications between one or more client devices such as client device 104 and visual analyzer system 102. Communication network 108 can be of various types and can include one or more communication networks. For example, communication network 108 can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 108 may include any communication network or infrastructure that facilitates communications between one or more client devices such as client device 104 and visual analyzer system 102.

Client device 104 can display one or more visualizations (also referred to as graphics or charts) through a web browser or a user interface of a visual analyzer application in some embodiments. A visualization can be generated based on dimensions of data (also referred to as columns in a database or business objects) identified by a user of client device 104. In some embodiments, a user of client device 104 can select one or more dimensions of data 118 available from various data services 106. Upon receiving the user's selection of the one or more dimensions of data 118, a visual analyzer module 120 can obtain the requested data from data service 106 via communication network 108 and generate a visualization 126. Visual analyzer module 120 can be an application program or a piece of code that is executable on individual computing devices. Renderer 122 can then render one or more visualizations 126 on GUI 124 of client device 104. GUI 124 can present multiple visualizations 126 and or other objects and tools to the user.

In some embodiments, visual analyzer module 120 on client device 104 can be a standalone executable application, a portion of an application (e.g., a browser application or a local application), a configuration file to be used with another application, etc. The web browser or the visual analyzer application user interface can provide a projection of one or more databases. The user can identify one or more dimensions of data available in the one or more databases and request the visual analyzer application to generate a visualization that represents the one or more dimensions of data retrieved from the databases. As described, an example of a database is a relational database with columns and rows. A dimension of data can correspond to a column in a database while records can correspond to the rows in the database. In some embodiments, a hierarchical relationship graph (e.g., a tree structure of the edges) can be generated for a graphic visualization where the nodes can correspond to the different edges of the visualization.

As described, a visual analyzer application can display one or more visualizations 126 on GUI 124 of client device 104. In some embodiments, the visualizations may be generated by visual analyzer module 120, rendered by renderer 122, and displayed on device 104 through a web browser or a user interface of the visual analyzer application in some embodiments. The web browser or the visual analyzer application user interface can provide a projection of one or more databases using one or more representations (e.g., tabs, text, menus, business objects, folders). The user can select one or more dimensions of data (also referred to as columns in a database, or business objects) available in the one or more databases and displayed via a data elements pane in the visual analyzer application to be presented by a visualization. The application may then generate and display a visualization based on the one or more dimensions of data that the user has selected and dropped into a canvas layout of the visual analyzer application. In some embodiments, the visualization is generated by visual analyzer module 120 sending a query to data service 106 that then retrieves the relevant data 118 from a database.

After one or more visualization have been generated and presented on client device 104, the user can specify one or more modifications to a visualization. The modification can be an addition of, a removal of, or some other sort of modification to one or more dimensions of data. In some embodiments, the user can specify to add a dimension of data by dragging an object (e.g., a selectable element in a data elements pane of visual analyzer application) representing data in a database and dropping the object onto any portion of a canvas layout that is displaying the visual representation. In certain embodiments, the user can remove a dimension of data by de-selecting or by deleting an identifier object representing a dimension of data or an edge identifier to which the dimension of data is currently mapped. Upon receiving the indication of a change in the contents to be presented by the visualization, visual analyzer module 120 on client device 104 can convey the desired change information to visual analyzer system 102.

Visual analyzer system 102 includes multiple components such as, but not limited to, a visualization modifier 110, memory 128, and a rendering engine 132 in some embodiments. In certain embodiments, visualization modifier 110 performs the determination in how a visualization may be presented based on user input. For instance, visualization modifier 110 may select a certain visualization type to accommodate the data (e.g., multiple columns) that the user wants represented by a visualization. In making the selection, visualization modifier 110 may compute a set of scores for a number of visualization configurations to determine the most effective visualization to represent the columns of data. The most effective visualization may include a specific visualization type and a manner in which the data is represented by the different edges of the visualization. In another instance, visualization modifier 110 may determine how to map values in edges of a first, source visualization to edges of another, target visualization identified by a user. The determination can be done by calculating edge distances between the two visualizations in some embodiments, which will be further described below.

In some embodiments, visualization modifier 110 can include a distance determiner 112, a mapper 114, a viz type selector 116, a configuration generator 150, and a configuration scorer 134. Memory 128 can store configuration information for one or more visualizations, existing GUI information 138, preference information 140, rules 142, and user configured visualization type 144. In some embodiments, rendering engine 132 can render the GUI with the updated visualization. In some embodiments, rendering engine 132 can be part of a remote server while in certain embodiments rendering engine 132 may be running on a client device (e.g., renderer 122). The various components (e.g., visualization modifier 110 or subcomponents within) in visual analyzer system 102 may be part of a server or part of client device 104 where visual analyzer module 120 need not have access only through a communication network 108. Some embodiments may also have a plugin adapter 130 that enable a user to add any other types of visualizations (or other visual analyzer system components such as tools that can interact with the visualizations) as desired to this flexible plugin system. The extendibility of the flexible plugin system permits users to create or install new visualization types and present data in creative, effective, and intuitive ways.

Memory 128 can include configuration information 136 for various visualization types. In some embodiments, configuration information 136 can include the edge information for each visualization type. For instance, configuration information 136 can include a list of edges for each visualization of a certain type as different visualizations of a different type may have a different set of edges. As described, the edges represent the attributes of each visualization, including axis (e.g., x, y), color, size, shape, etc. In some embodiments, each edge can have edge values and tags associated with the edge. One type of tag can indicate whether the edge is a "required" edge where edge values are necessary for the edge in order for the visualization to render.

Memory 128 can also include existing GUI information 138 in some embodiments. Existing GUI information 138 can include information on one or more visualizations that are currently being displayed in the GUI. For instance, existing GUI information 138 can include edge information for the one or more visualizations such as the visualization type and one or more additional edges of the visualization.

In certain embodiments, memory 128 also includes preference information 140 that includes information on the types of visualizations preferred by a user. In some embodiments, preference information 140 may be indicated by a user via configurable system settings. Visual analyzer system in some embodiments may track the user's historical behavior in determining user preference. For instance, if the user has indicated in the past repeatedly that the user prefers to view information via a particular type of visualization e.g., by switching to that type of visualization, then preference information may indicate that the user prefers the particular type of visualization. In some embodiments, the preference information may also include the preference of general users obtained through statistics. For instance, if general users (e.g., of a visual analyzer system or other type of visualization system) prefer to view certain types of information via certain types of visualizations, the preference information may give more weight to certain types of visualizations when determining which types of visualizations to use in presenting data.

In some embodiments, memory 128 includes rules 142 that can be used by configuration generator 150 and configuration scorer 134 in determining one or more configurations and in scoring the configurations. In certain embodiments, configuration generator 150 may use rules 142 to determine which edges of a visualization can consume which types of dimensions in generating a configuration. In some embodiments, configuration scorer 134 may use rules 142 to determine which mappings may receive what score. For instance, rules 142 may specify that assigning a company location dimension to a category (geo) edge can have a value of 30, while assigning a company location dimension to a category (x) edge may have a value of 7. In some embodiments, configuration scorer 134 may also determine which mapping of the dimensions to the edges may achieve a highest score. In certain embodiments, rules 142 can also be used in computing the distances between the edges of two visualizations. For example, rules 142 can specify a tree structure for each visualization of a different visualization type.

In the instance where there is no starting visualization, the user input may specify one or more dimensions of data (e.g., year, company name, revenue, product type, etc.) that the user would like presented by a visualization. In certain embodiments, visual analyzer system 100 can determine the visualization type to use in presenting the data selected by the user. In some embodiments, visual analyzer system 100 can also determine the manner in which to present the data using the visualization type. For example, visual analyzer system 100 may determine which edges of the visualization to correspond to which dimension(s) selected by the user.

In certain embodiments, in addition to the user specifying a dimension for creating a new visualization, the user input can specify a modification to add or remove a dimension from an existing visualization. Based on the user input specifying a dimension (to add or to remove), configuration generator 150 can generate a number of visualization configurations for some or all of the visualization types available (including any user configured visualization types added via plugin adapter 130). The visualization configurations can include a mapping of different dimensions to different edges of a visualization. As described, there may be different edges for each visualization depending on the visualization type. In certain embodiments, configuration information 136 can include the visualization configurations.

The different visualization configurations may have incorporated the modification to the dimensions specified by the user. For example, in the event that the user input specified an addition of a dimension to a visualization, the different visualization configurations may include a mapping of the dimension newly specified to be added by the user to an edge of different visualizations. In the instance where the user input specified a removal of a dimension to a visualization, the different visualization configurations may include a mapping of the remaining dimensions (less the specified dimension) to edges of different visualizations.

In some embodiments, configuration scorer 134 can score the different configurations. In certain embodiments, configuration scorer 134 can score each configuration using a configuration scoring algorithm that includes at least one of a base score, a preference score, a transition score, and a semantic difference score. The base score can indicate the suitability of a mapping of certain dimensions to certain edges. For instance, visual analyzer system 102 may determine that a mapping of a company location dimension to a category (geo) edge in a map may have a higher score compared to the mapping of the company location dimension to a category (x) edge in a bar chart. The preference score can indicate a general preference towards visualizations of different visualization types or the user's preference towards visualizations of different visualization types. For instance, visual analyzer system 102 may determine that the general population favors bar charts over scatterplots and therefore may assign a bar chart type visualization a higher preference score. In another instance, visual analyzer system 102 may determine, based on monitoring the user's past behavior, that the user prefers certain types of visualizations over others and assign those certain types a higher preference score compared to the others.

Embodiments may also account for a visualization type-switch penalty when determining how to display the new visualization incorporating the user's modifications. Some embodiments may include a transition score for scoring a configuration when the modification is being made to an existing visualization. In some embodiments, the transition score can represent a penalty to those configurations that represent a visualization type different from the visualization type of the existing visualization. For instance, the transition score can be a negative score that is assigned to those configurations that have a different visualization type from the existing visualization. In certain embodiments, the transition score can be a positive score that is added to those configurations where the visualization type is the same as the visualization type of the existing visualization.

In some embodiments, the switch penalty may cause the visualization to retain its visualization type even after incorporating the modification. As described, the modification may be an addition or a removal of a dimension being represented by an edge of the visualization. In instances where the switch penalty may not be great enough to retain the pre-existing visualization type, the updated visualization may have a different visualization type than the pre-existing visualization.

Some embodiments may also account for a semantic difference score. In certain embodiments, when adding more data columns to a visualization, it may be desirable to transform the current visualization into a different chart type, to be able to better depict the all the data dimensions assigned. When the chart type is changed, some embodiments may implement the change in a way that minimizes the semantic difference in how the data is graphed, i.e. preferably maintain existing assignments like axes, coloring size and other properties. In some embodiments, the semantic difference score can be calculated using an edges distance determiner 112 that can calculate a difference score between the pre-existing configuration and the potential configurations. If the difference score is high for a visualization configuration, then that visualization configuration may be less desirable compared to another configuration that has a lower difference score, so as to retain the original configuration as much as possible.

In some embodiments, the configuration score for a configuration can be calculated by adding up the base score, the preference score, and the transition score, and subtracting the difference score. In certain embodiments, upon computing the configuration scores for all the configurations, viz type selector 116 may then select the configuration that has the highest configuration score. In some embodiments, viz type selector 116 may then determine the visualization type that corresponds to the configuration with the highest configuration score. In certain embodiments, depending on which configuration has the highest score, viz type selector 116 may select a visualization type that is the same type as the existing visualization or a different type compared to that of the existing visualization.

As described, visual analyzer system 100 can determine the visualization type for the specified input edges using a different scoring algorithm. In some embodiments, an edge distance scorer (not shown here) can perform a similarity comparison between the input edges selected by the user and the edges of the individual configurations for the various types of visualizations. In performing the similarity comparison, edge distance scorer may compute a distance score for the input edges and the edges of each of the visualization types. Viz type selector 116 may then select the visualization type that has the highest distance score to be used to display the input edges. In certain embodiments, the distance score can include a base score and a preference score. The preference score can indicate a general user preference or a targeted user preference for certain types of visualizations over other types of visualizations.

In some embodiments, edge distance scorer may compute a distance score that includes a bias score (also referred to as a switch penalty score or stickiness score) in addition to a base score and a preference score. The bias score can indicate a bias towards retaining the original visualization type. Thus, for visualization types that are different from the visualization type of the existing visualization, the bias score may be lower (or a negative value) compared to a bias score for the same visualization type. In instances where the total of the base score and the preference score of one configuration that has a different visualization type is much greater than the total of the base score and the preference score of a configuration that has the pre-existing visualization type, the bias score may not be great enough to retain the pre-existing visualization type. In those instances, the visualization type of the new visualization may be updated to a new visualization type.

In some embodiments, configuration scorer 134 can compute a score for each configuration based on one or more of configuration information 136, existing GUI info 138 (if there was a pre-existing visualization before the user made the adjustment), preference information 140, rules 142, and user configured visualization type 144 (if the user has specified an additional visualization type in addition to those readily available in the visual analyzer application). Based on the scores, viz type selector 116 can then select a configuration with the highest score and determine a visualization type corresponding to the configuration with the highest score. In some embodiments, the visualization configuration can then be sent to the renderer 132 or 122 and the renderer 132 or 122 may render the visualization on GUI 124 based on the configuration.

In some instances, a user may desire to switch from displaying one visualization type to another. For instance, there may be a bar chart that is currently displaying the dimensions of data previously selected by a user and the user may indicate a switch from the bar chart to another type of chart such as a pie chart. Some embodiments may determine how to map values of the edges in the source visualization to the edges in the target visualization by performing a distance calculation between the edges of the visualizations.

In certain embodiments, edge distance determiner 112 can perform an edge mapping between two visualizations in order to transfer the values from edges of a first visualization with one visualization type to edges of a second visualization with another visualization type. Edge distance determiner 112 can obtain edge information for existing visualization type from existing GUI info 138. Edge distance determiner 112 can then create an edge mapping between the edges of the existing visualization to edges of the target visualization. In some embodiments, the edge mapping can be performed by determining the distance between edges of the source and the target visualizations. In certain embodiments, the distance between edges can be determined based on tags associated with each edge. For instance, the distance between edges that both have edge identifiers as color would be smaller compared to the distance between an edge with an edge identifier as color and another edge with an edge identifier as size.

In certain embodiments, the edge mapping may also prioritize mapping the required edges of the target visualization to ensure that the required edges have values that are mapped to it. The required edges information can be obtained from configuration info 136 stored in memory 128. In some embodiments, edge distance determiner 112 can determine the required edges in the target visualization and fill those first. For example, if a geo-location edge in a target visualization has been identified as an essential, required edge (e.g., in order for the visualization to render), then edge distance determiner 112 may then prioritize filling the required edges with edge values in the source visualization.

Once edge distance determiner 112 determines the mapping between the edges of the visualizations, mapper 114 can perform the mapping function where the values from edges are then mapped to the corresponding edges in the target visualization. Upon mapping the edge values, mapper 114 may then send the mapped values to rendering engine 132 or renderer 122 for the new updated visualization to be rendered. The rendered visualization is now of the target visualization type. As described, the edge values can correspond to values in dimensions or data or values in columns of a database.

Some embodiments also have a plugin adapter 130 that allows users to provide configuration information for a new visualization type (e.g., donut map) 144. In some embodiments, the user may provide one or more user-configured visualizations and related information 144 to the plugin adapter 130. Visual analyzer system 100 is capable of incorporating the user-configured visualization that has visualization types not pre-existing in visual analyzer system 100. The flexibility of the system enables the system to accommodate the user-configurable visualization types and allow a user to interact with the user-configured visualization while ensuring that the functionalities described in the specification (e.g., mapping, edge distance determination, etc.) can also be applied to these user-configured visualizations. In some embodiments, the configuration information for these user-specified visualizations can include edge information. The visualization may have a set of edges with edge identifiers and edge values, similar to those pre-defined in the system. Further, the configuration information may also include tags for the edges that for example identify whether an edge is a required edge or not. The configuration information 136 for the user configured visualization type 144 may be provided by the user via the plugin adapter 130 and stored in memory 128.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

II. Example Process of Determining and Presenting a New Visualization

Figure 2:
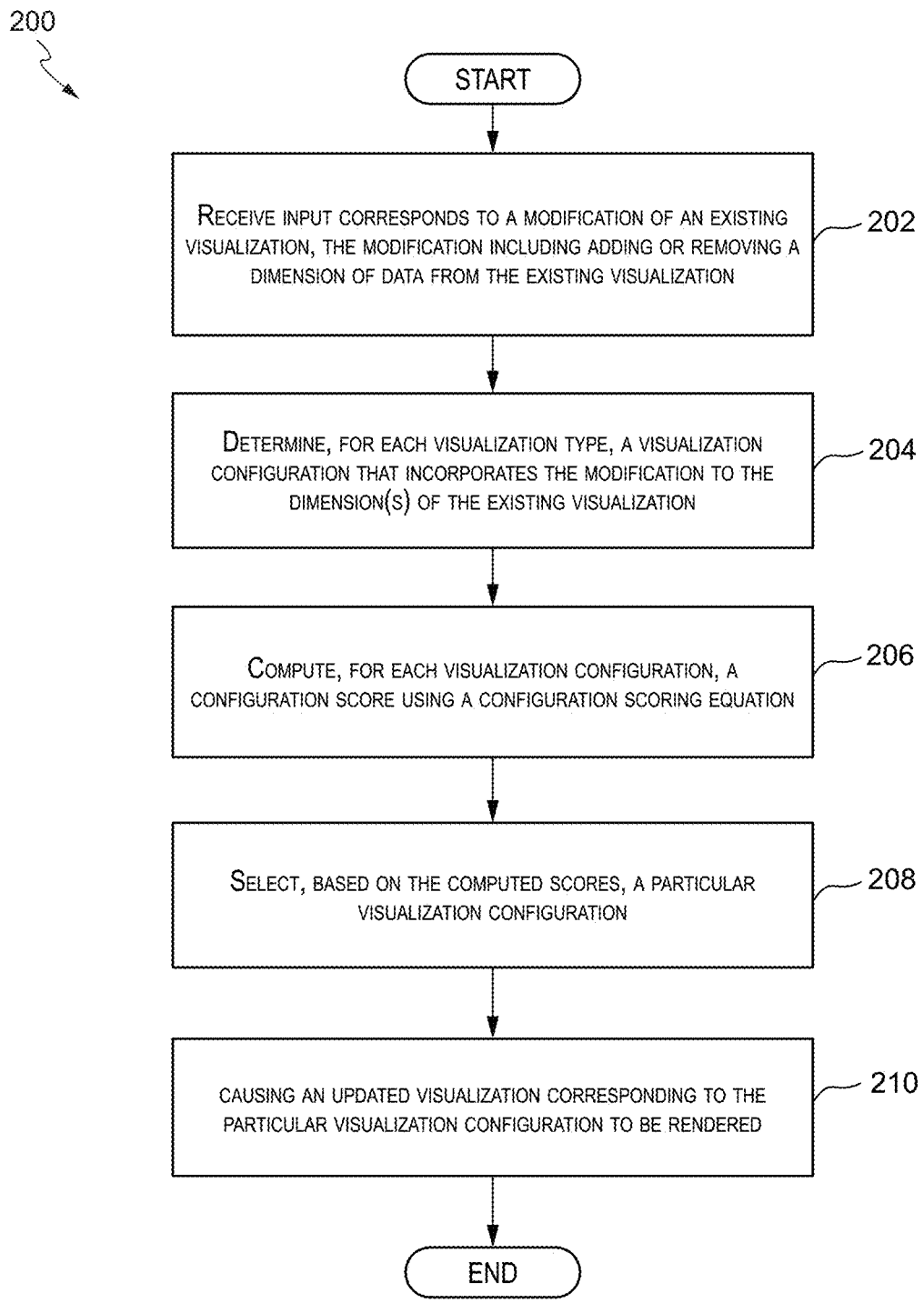
FIG. 2 illustrates an example process of determining a new visualization to present to the user in response to a user request to modify a dimension on an existing visualization in accordance with some embodiments of the present invention.

Some embodiments can determine a visualization with a visualization type that is best suited to display one or more dimensions of data selected by a user. FIG. 2 illustrates an example process 200 of determining a new visualization to present to the user in response to a user request to modify a dimension on an existing visualization in accordance with some embodiments of the present invention. In some embodiments, the flow 200 can be performed by a client device or one or more server devices or a combination thereof.

At block 202, process 200 can receive user input that corresponds to a modification of an existing visualization where the modification includes adding or removing a dimension of data from the existing visualization. The existing visualization may have existing viz type information indicating that the existing visualization is of a first visualization type. The existing visualization may also be representing one or more dimensions of data via its one or more edges. In some embodiments, the user input may be a selection of one or more dimensions to add to an existing visualization (e.g., via a drag-and-drop motion where a selection of a dimension is made from a data elements pane and dragged to a visualization being displayed in a canvas layout). In certain embodiments, the user input may be identifying a dimension that is currently being presented in the visualization to be removed from the visualization. In some embodiments where there is no starting visualization, the user input may correspond to a selection of one or more dimensions of data to generate a new visualization. The user input may be a selection of a dimension from the data elements pane and dragging the selection to anywhere in the canvas layout portion of the GUI.

At block 204, process 200 can determine, for each visualization type, a visualization configuration that incorporates the modification to the dimension(s) of the existing visualization. The visualization configuration can be determined by a component such as configuration generator 150 from FIG. 1. Some embodiments may generate several visualization configurations based on the modification and the initial dimensions of data that were used in constructing the initial visualization. Each of the configurations can represent a different visualization. In some embodiments, there can be multiple configurations that are within a same category of visualization types (e.g., multiple bar charts with dimensions mapped to different edges of the bar chart). There can also be multiple configurations for multiple visualizations with different visualization types.

In some embodiments, there may be only one visualization configuration generated for each visualization type. Generating the visualization configuration may include determining the set of dimensions after the modification has been made (i.e., whether the modification has added a dimension or removed a dimension) and then mapping each of the set of dimensions to an edge of a visualization. In certain embodiments, the visualization configuration may be determined based on a set of rules. Some embodiments may map a dimension to an edge of the visualization when the value is the highest compared to mapping the dimension to other edges of the visualization. For example, if mapping a company location dimension to a category edge get a higher score than mapping the company location to a color edge, then the configuration may include mapping the company location dimension to the category edge. In certain embodiments, there may be edges of a visualization that are associated with a "required" tag, and as such, the configuration may map at least one of the set of dimensions to the "required" edge, regardless of whether the mapped score is higher compared to mapping the dimension to another edge.

At block 206, process 200 can calculate a configuration score for each of the multiple configurations using a configuration scoring equation. The configuration score can be calculated by a component such as configuration scorer 134 from FIG. 1. In some embodiments, the configuration scoring equation can include a base score, a preference score, a transition score (also referred to as penalty score or bias score), or any combination thereof. In certain embodiments, instead of computing a base score and a preference score (and/or a transition score), the configuration score can include a distance score between the user-selected edge information and the various configurations for the different visualization types.

Some embodiments may assign a base score for each mapping of a dimension to an edge of a visualization. Certain embodiments may determine the base score to assign each mapping based on a set of rules (e.g., rules 142 from FIG. 1) that may include a table (e.g., a lookup table (LUT)). For example, some embodiments may assign a base value of 10 for mapping revenue dimension to a value edge of a bar chart. In another example, some embodiments may assign a base value of 30 for mapping a company location to a category (geo) edge of a geographical map type chart. Different embodiments may assign different base values for various mappings for visualizations of different visualization types. In embodiments where a user configured visualization type has been added to visual analyzer system (e.g., via a plugin adapter), the rules for scoring each mapping may also be specified by the plugin.

In some embodiments, the configuration score can also include a preference score. The preference score may indicate a user's preference towards different types of visualizations. For instance, if the user generally prefers bar charts over pie charts, then the preference score for bar charts may be higher than the preference score assigned to pie charts. The user preference can be determined based on the user's historical behavior monitored by the visual analyzer application. If the visual analyzer application consistently detects that the user changes a pie chart visualization to a bar chart visualization, the visual analyzer application may determine that the user's preference is for bar charts over pie charts. In certain embodiments, the preference score may indicate the preference of the general public (or users of a visual analyzer application). For example, past studies on general human behavior may indicate that the general public favors one type of visualization over others. As such, visual analyzer application may assign a higher preference score for those visualization types that are deemed to be generally more popular. Certain embodiments may assign a preference score for each configuration based on a set of rules (e.g., rules 142 from FIG. 1) that may include a table (e.g., a lookup table (LUT)). The preference score for different types of visualizations may vary over time and updated on a regular basis as additional user activity is tracked and as the user's preference indications change based on the additional user activity.

In certain embodiments, the configuration score may include a transition score that indicates a preference for those visualization configurations that have a same visualization type as the existing visualization. The transition score can provide added weight to the visualization configurations with the same visualization type by assigning a positive (or higher) score while assigning those configurations that do not have the same visualization type a negative, zero, or lower score. The transition score for transitioning to various different visualization types may also be different. For instance, transitioning from a bar chart to a pie chart may have a higher score compared to transitioning from a bar chart to a scatterplot. The visual analyzer application can assign the different transition scores based on a set of rules (e.g., rules 142 from FIG. 1) that may include a table (e.g., a lookup table (LUT)).

At block 208, process 200 can select, based on the computed scores, a particular visualization configuration from the several configurations. In some embodiments, the selection can be made by a component such as the viz type selector 116 in FIG. 1. The visualization configuration can be of a same type of visualization or of a different type of configuration compared to the original, existing visualization. In some embodiments, a viz type selector may select the particular visualization configuration with the highest configuration score.

At block 210, process 200 can cause an updated visualization corresponding to the particular visualization configuration to be rendered. In some embodiments, the updated visualization can be generated by a component such as rendering engine 132 or renderer 122 in FIG. 1. Some embodiments may determine whether the visualization type of the selected configuration is the same as the original, existing visualization type. In certain embodiments, upon determining that the visualization type is the same, the visualization may be rendered with the updated dimensions. The information may be sent to the renderer such as rendering engine 132 or renderer 122 to be rendered on GUI 124. A visualization with the same visualization type may be displayed, but with some additional information. In some embodiments, the additional information may be an additional edge that has been added to the visualization or a removal of an edge that was previously part of the visualization. Other types of additional information such as changes to the values of the edges may also be displayed, depending on the user's request.

Some embodiments may factor in a semantic difference between the original, pre-existing visualization and a potential visualization with a certain configuration in determining the updated visualization. In some embodiments, the configuration scoring equation may also include a semantic difference component where a semantic difference score may be computed. As described, some embodiments may adjust a visualization to accommodate the user modification even when the visualization type has not changed. The edge values (also referred to as columns or dimensions) may be mapped to different edges in the visualization to effectively incorporate the modification. In some embodiments, upon determining that the visualization type is the same, process 200 may send the information to edge distance determiner such as edge distance determiner 112 in FIG. 1. Edge distance determiner can determine the edge distance (also referred to as the semantic difference) between the edges of the original visualization and the edges of the target visualization. A mapper may map values corresponding to edges in the original visualization to different edges in the target visualization. In some embodiments, the mapper may identify the nearest empty edge for the newly added dimension and map the newly added dimension to this edge in the newly updated visualization.

In certain embodiments, upon determining that the visualization types are not the same, process 200 can determine a mapping of the values from the edges of the original, existing visualization to the edges of the new visualization with the new visualization type. In some embodiments, a viz type selector such as viz type selector 116 in FIG. 1 can send the selected visualization to edge distance determiner such as edge distance determiner 112 in FIG. 1. Edge distance determiner 112 may retrieve configuration information for the selected visualization type (which is now the target visualization type) and determine the distance between edges of the two visualizations.

Mapper such as mapper 114 in FIG. 1 can then select a mapping configuration based on the distances computed between the edges of the visualizations. In some embodiments, mapper may map the values from one edge to another edge where the edge distance has been determined to be the shortest. In certain embodiments, mapper may first identify the required edges in the selected visualization and ensure that there are values mapped to those required edges first prior to mapping the remainder of the edges. After mapper performs a mapping of values between edges of the visualizations, process 200 can then send the mapping information to the renderer for the new updated visualization to render on the GUI.

Figure 3:
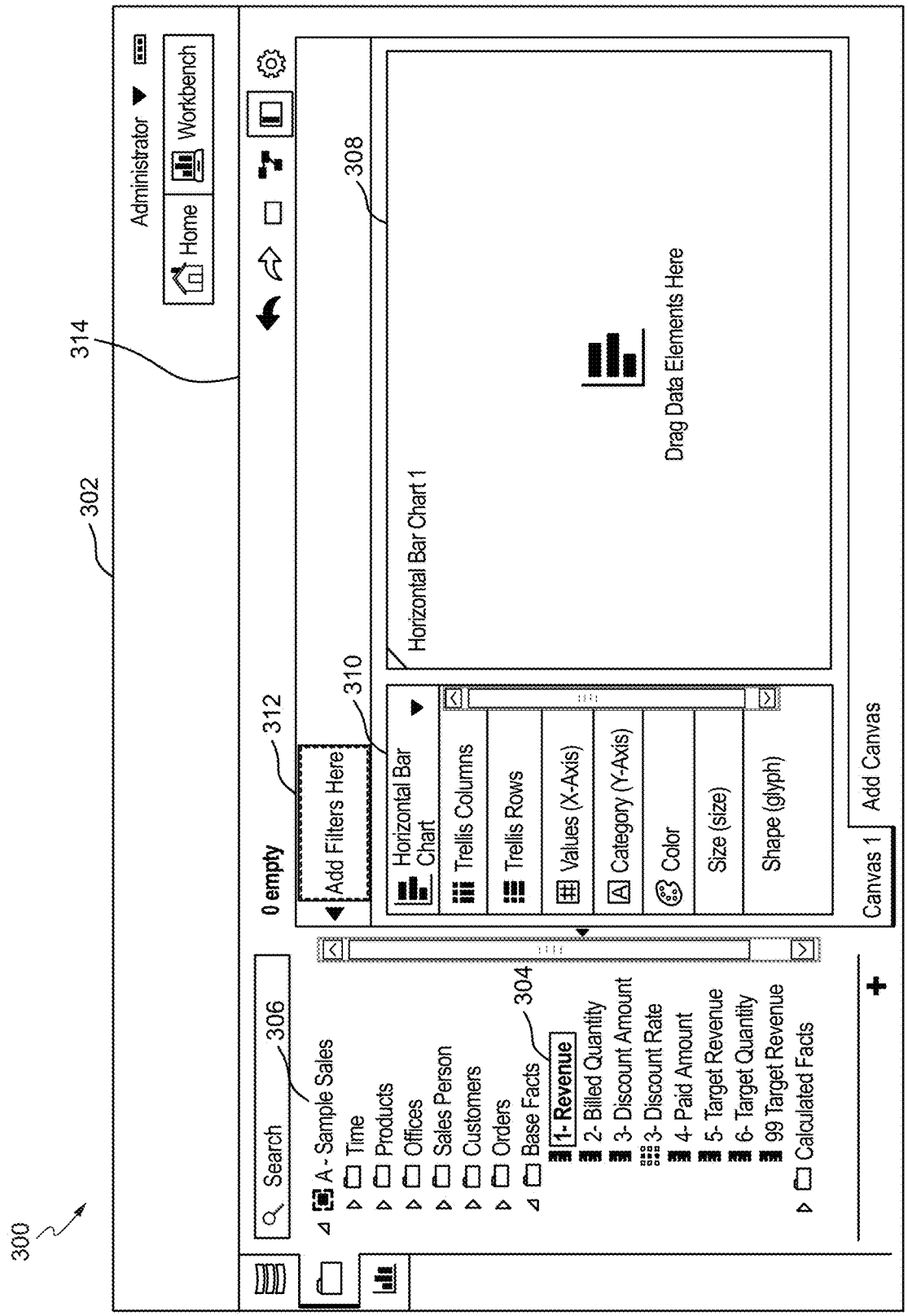
FIGS. 3-8 includes screenshots that show a sequence in adding new dimensions of data to create a visualization in accordance with some embodiments of the present invention.

III. Screenshots for Showing a Sequence in Adding New Dimensions and Modifying a Visualization FIGS. 3-8 includes screenshots 300-800 that show a sequence in adding new dimensions of data to create a visualization. As shown in FIG. 3, a GUI 302 of a visual analyzer application can be displayed e.g., via a Web browser or an application running on a user's computing device such as a mobile device. GUI 302 can include a data elements pane 306 where one or more selectable elements representing different dimensions of data can be displayed, a canvas layout 308 where one or more visualizations can be displayed, an edges pane 310 where the edges of a visualization with a visualization type can be displayed, a filter column 312 where a user may add filters to filter the data displayed, and one or more control elements 314 (e.g., undo button, settings button, etc.). Different embodiments may display the different elements in the visual analyzer application differently.

As shown in GUI 302, a revenue dimension 304 in a data elements pane 306 is highlighted, indicating that it has been selected by a user of visual analyzer application. The user may drag the selection to canvas layout 308 and drop the selection in canvas layout 308 to indicate that the user would like a new visualization created with the selected dimension. In this example, the default visualization type is the horizontal bar chart. Different embodiments may have different default visualization types. Some embodiments may determine a visualization type depending on the dimension (e.g., dimension characteristics, dimension members) that the user has selected for creating the visualization. The dimension characteristics can indicate whether the selected dimension is a numerical-type dimension or a categorical-type dimension. The dimension members can indicate how many dimension members there are and the range of values of the dimension members.

Figure 4:
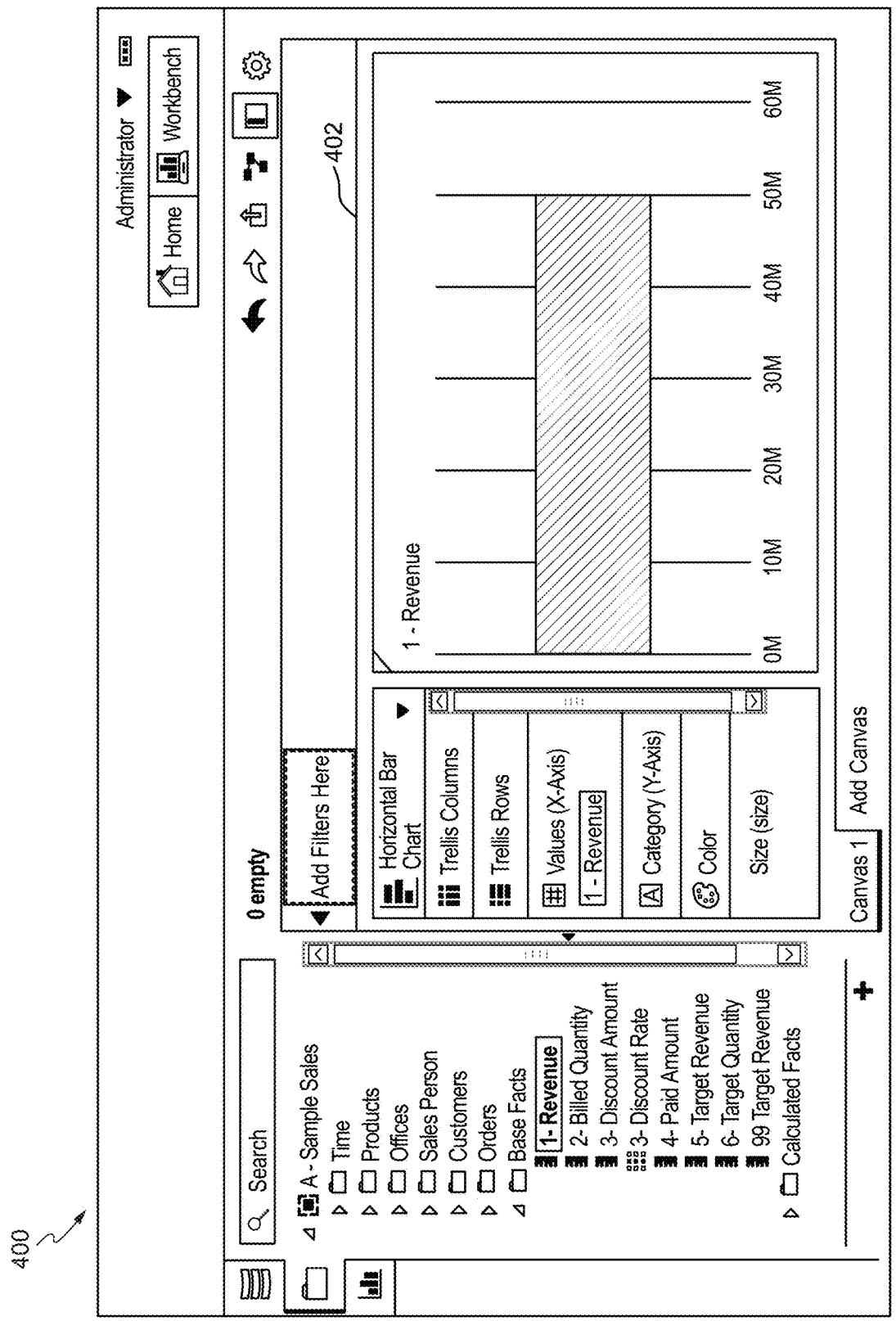

FIG. 4 shows the rendering of the selected revenue dimension in a bar chart visualization 402. While the user may indicate the edge of the visualization to use in representing the dimension, some embodiments automatically determine the edge that would be most appropriate to represent the data of the selected dimension. Embodiments may use the techniques described in FIGS. 1 and 2 and performed by various components of the visual analyzer application, including configuration generator 150 and configuration scorer 134 from FIG. 1. In some embodiments, a visual analyzer component such as a scorer may determine that mapping the revenue dimension to the values (x-axis) edge would obtain a higher score than mapping the revenue dimension to other edges of the visualization. As such, visualization may display the revenue dimension in the values edge of the horizontal bar chart.

Figure 5:
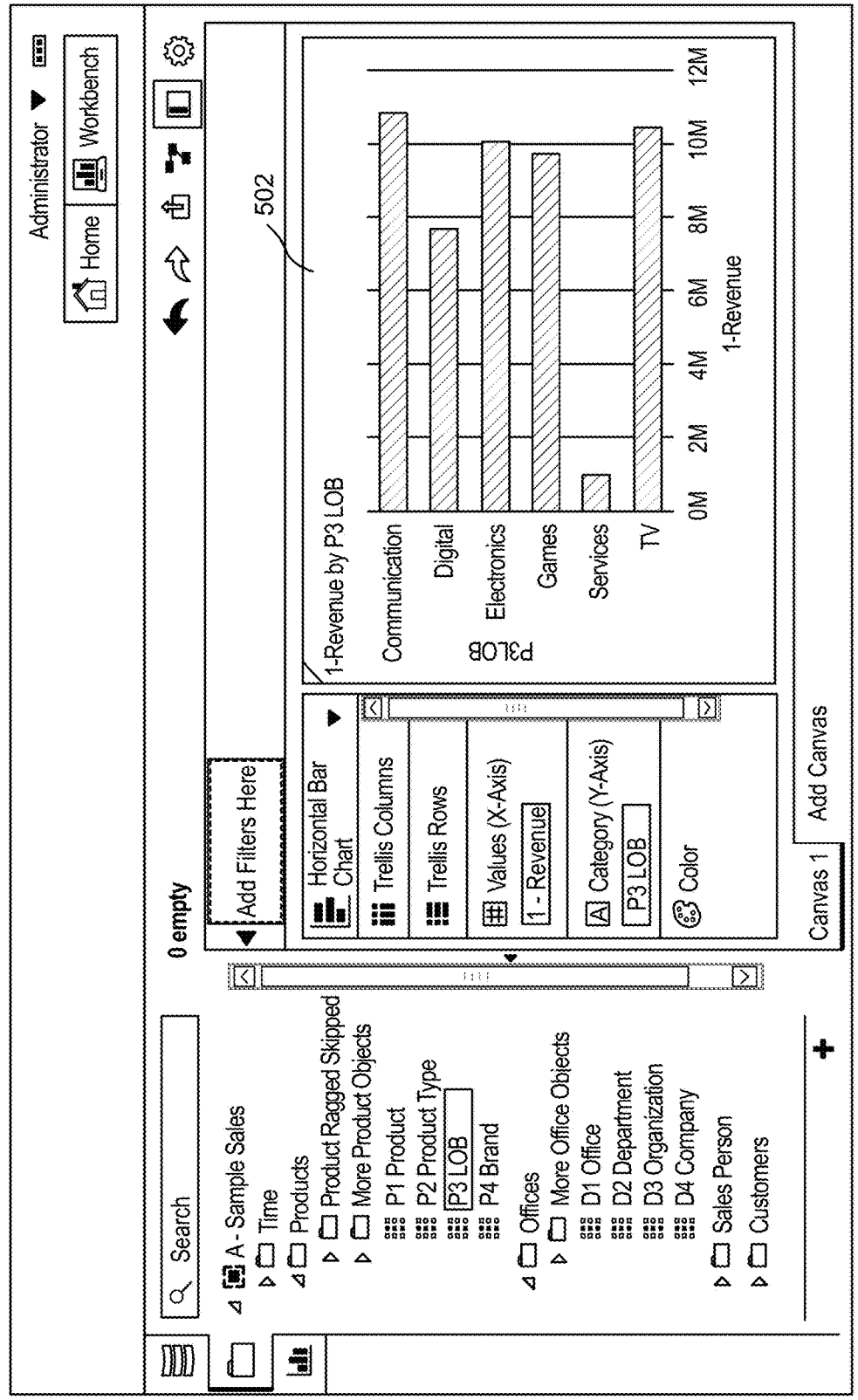

FIG. 5 shows that the user has selected to add another dimension: large objects (LOB) dimension and that the visualization 502 has been updated to display the LOB dimension in the category (y-axis) edge of the visualization 502. Again, while the user may specify which edge of the visualization to use in representing the newly added dimension, visual analyzer application may automatically determine the best way to present the newly added data. In some embodiments, a scorer may determine that mapping the LOB dimension to the category (y-axis) edge provides a higher score compared to mapping the LOB dimension to other edges of the visualization.

Further, various visualization configurations with other visualization types may also be determined and scored where the various visualization configurations have incorporated the addition of the new dimension. Some embodiments may determine, based on a sum of the base score, the preference score, and the transition score, that the configuration where the revenue dimension is mapped to the values (x-axis) and the LOB dimension is mapped to the category (y-axis) has the highest score. As mentioned, while there may be other configurations that have a different visualization type that have higher base and/or preference scores, the transition score favoring the original visualization type may cause the total sum of the configuration score to favor the configuration with the original visualization type.

Figure 6:
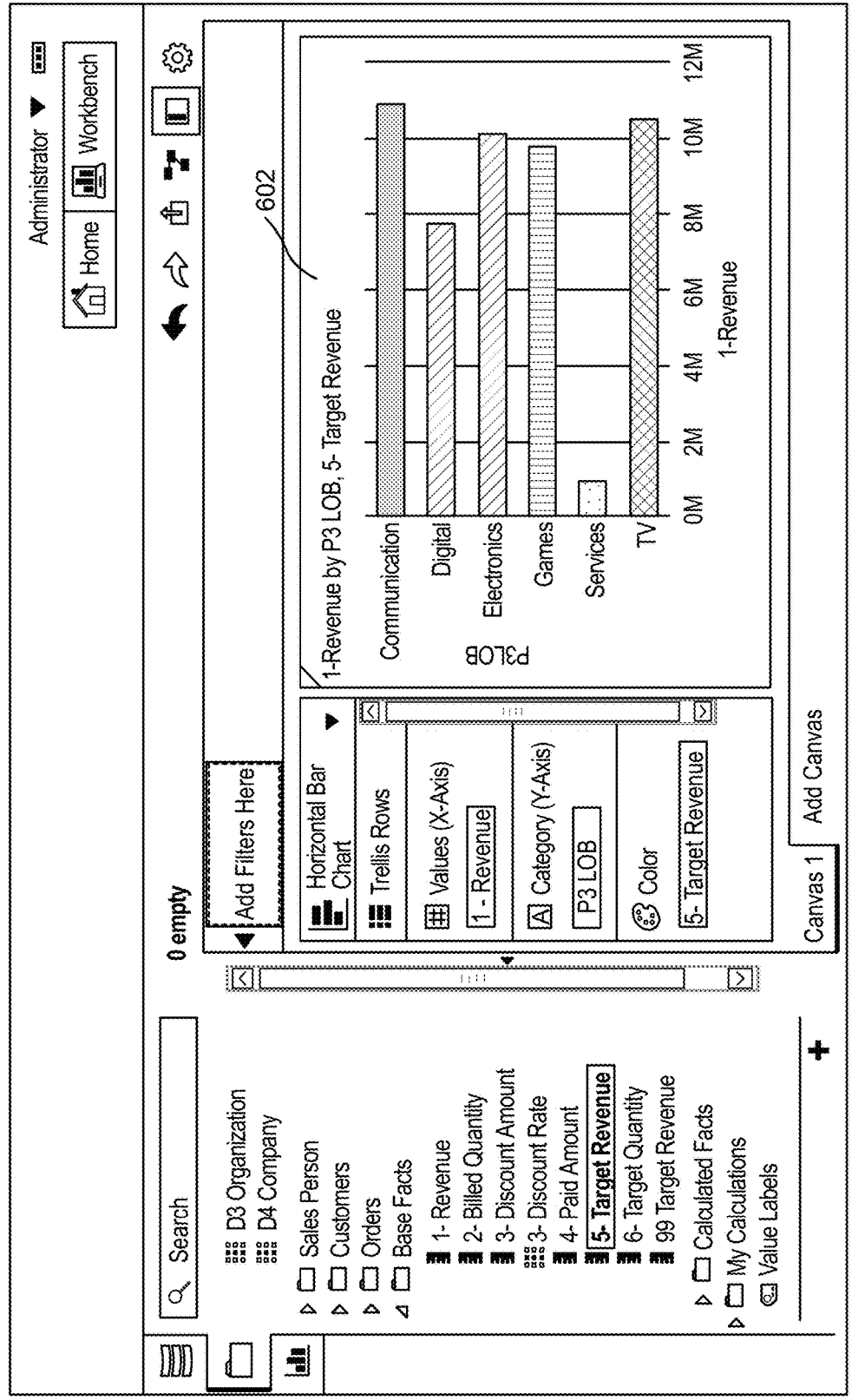

FIG. 6 shows that target revenue dimension has been added to the visualization. As shown, the visualization type has not changed. In some embodiments, the visual analyzer application may again perform a similar process as that described in FIG. 2 where configurations are determines and scored. The configuration with the same visualization type has been determined to have a highest configuration score in this example. The selected configuration may designate the target revenue dimension to be mapped to the color edge of the visualization. As such, these mappings of the configuration are shown in this visualization 602. In some embodiments, keeping the mappings of the previously shown dimensions to edges of the visualization may minimize the semantic distance between the visualization that was originally shown and the updated visualization. As such, some embodiments may minimize the semantic difference by scoring those configurations that have more similarities with the pre-existing configurations higher than those that have less similarities with the pre-existing configurations.

Figure 7:
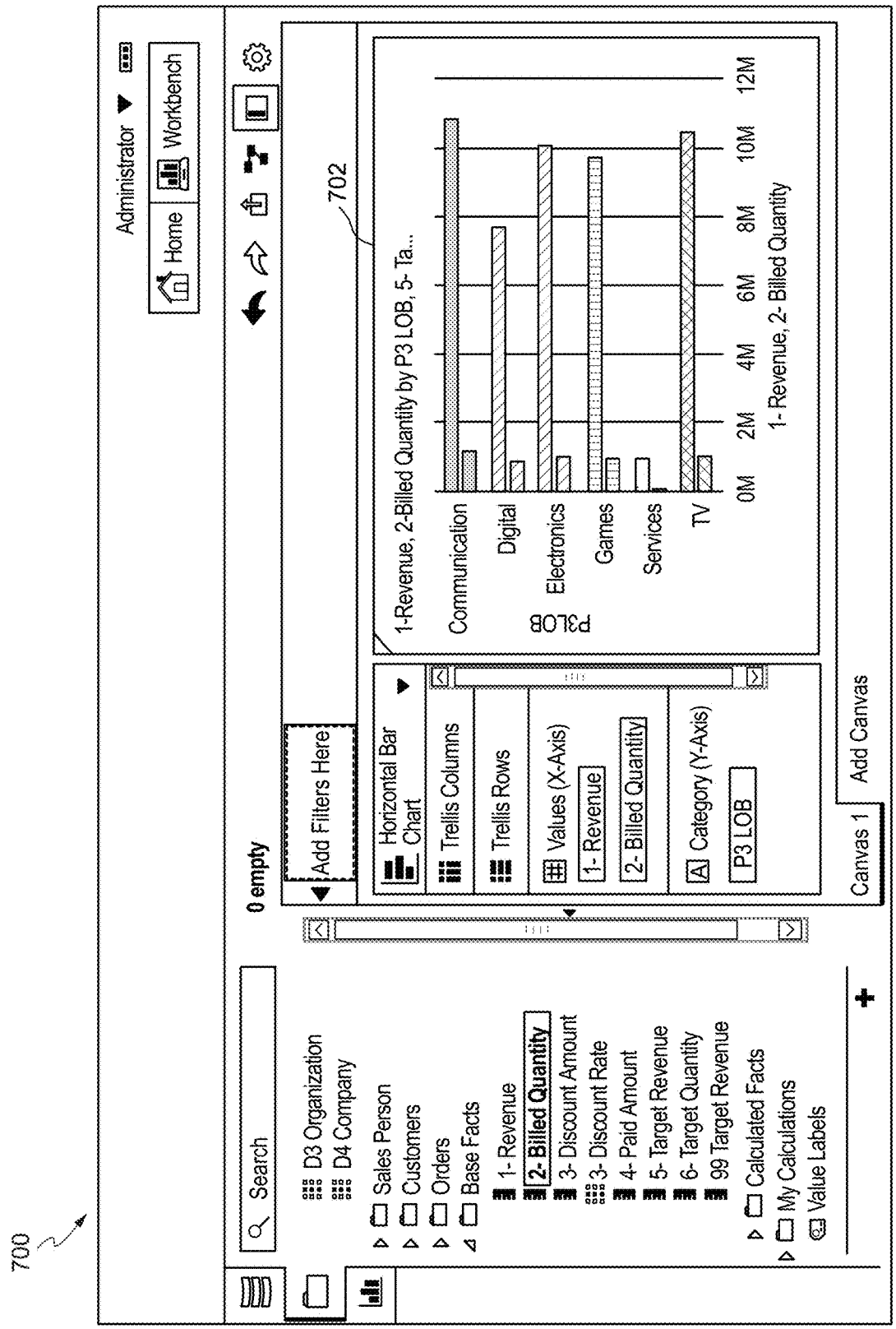
Figure 8:
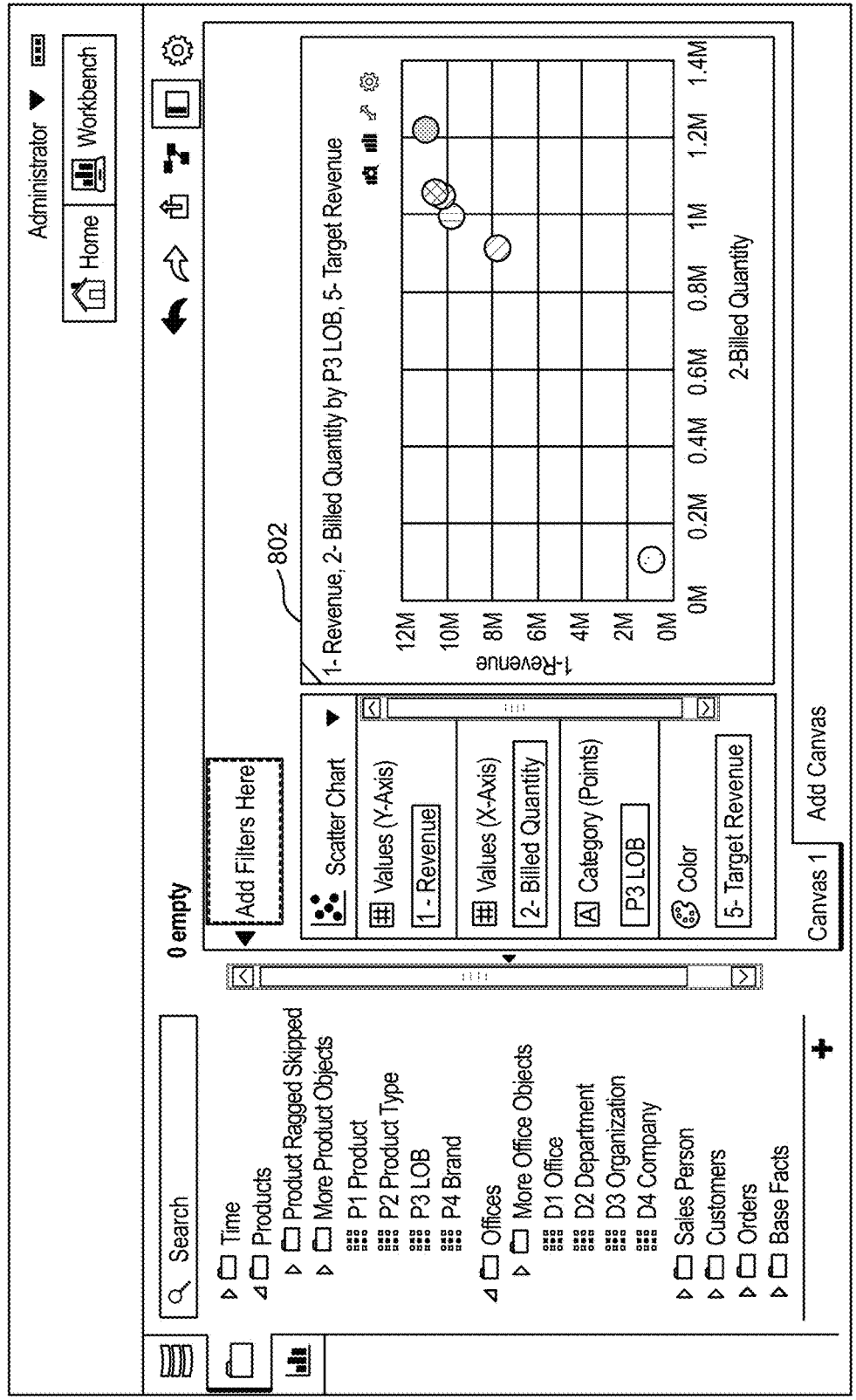

FIG. 7 shows that billed quantity dimension has been added to the visualization. Upon the user dropping an element representing the billed quantity dimension into visualization 702 displayed in the canvas layout, visual analyzer application may display a visualization where the newly added billed quantity dimension is represented by a values (x-axis) edge. While FIG. 7 shows one way of displaying the addition of a new billed quantity dimension of data, FIG. 8 shows another way of displaying the addition of the new dimension of data to the visualization. Some embodiments may display FIG. 8 instead of FIG. 7 since the visualization configuration corresponding to visualization 802 in FIG. 8 may score higher in the visualization scoring algorithm. The visual analyzer application may automatically present screenshot 1100 to the user upon receiving an indication to add the new dimension of data. In this example, using a process such as process 200 from FIG. 2, visual analyzer application has automatically determined, that with the addition of the billed quantity dimension, a different visualization type would be better suited in displaying the data. In this example, visual analyzer application has determined that displaying the billed quantity dimension in a values (x-axis) edge using a scatterplot, along with the other dimensions that were being represented by the pre-existing visualization 602 may be most intuitive to a user.

As described, some embodiments may use semantic distance based assignment of data elements (also referred to as dimensions of data) to visualization edges. In certain embodiments, when adding more data columns to a visualization, it may be desirable to transform the current visualization into a different chart type, to be able to better depict the all the data dimensions assigned. When the chart type is changed, some embodiments may implement the change in a way that minimizes the semantic difference in how the data is graphed, i.e. preferably maintain existing assignments like axes, coloring size and other properties.

Some embodiments provide an algorithm that uses a scoring function for performing visualization selection and property assignment based on at least one or more of i) the best placement for each used data column on the properties that the visualization supports; ii) the overall goodness of visualization type (also referred to as the base score); and iii) the semantic distance to original visualization and property assignments. Some embodiments use different scoring functions in the area of best placement. The algorithm in some embodiments may account for the semantic difference that uses a distance function similar to the algorithm described below in FIGS. 9-12.

IV. Example Configuration Score Computation

Some embodiments may trigger a scoring algorithm by dropping a new column inside a visualization (e.g., without a user specifying which edge to represent the new column). As described, each visualization can have one or more edges (e.g., E1, E2, E3, . . . En). In some embodiments, E1 can be a visualization type that can have an edge value of one of a bar chart, a pie chart, a scatterplot, some other customized chart, etc., E2 can be color, E3 can be size, etc. Each of the edges have a set of tags that can indicate whether an edge is required or not required for the visualization. In some embodiments, the configuration information of the visualization may also include other contextual information of the visualization such as functional information (also referred to as functional tags) that describes the functions of the visualization (e.g., whether the edge is a categorical-type edge or a value-type edge), etc.

In an example, the user may select (e.g., double-click, drag and drop into a canvas layout) a revenue dimension. In some embodiments, a scoring algorithm can be triggered. Another way to trigger the scoring algorithm is to drop a new column into the "Suggest" drop target inside a visualization. Another way to trigger the scoring algorithm is to select a "Re-suggest" button on the user interface that can show other possible options for the currently used data. In this instance, the algorithm may give more weight to the goodness of the visualization (also referred to as the base score) than the similarity (also referred to as the semantic difference score). In this example, the scoring algorithm may determine that a bar chart is the best visualization type to represent the selected revenue dimension. A bar chart may be rendered where the revenue dimension is represented by a category (y-axis) edge.

The user may then select a company location dimension. In some embodiments, the scoring algorithm is again triggered. Some embodiments may determine several configurations for the various visualization types and compute a configuration score for each of the configurations. One configuration can be a bar chart where the revenue dimension is mapped to the value edge and the company location dimension is mapped to the category (x-axis) edge. Another configuration can be a map where the revenue dimension is mapped to a color edge and the company location dimension is mapped to a category (geo) edge. Yet another configuration can be a line chart where the revenue is mapped to the value edge and the company location dimension is mapped to the category edge. There can be many more other configurations that correspond to the various visualization types determined for the set of dimensions to be represented.

In some embodiments, the configuration scoring algorithm can be a sum of a base score, a preference score, and a transition score. In certain embodiments, the configuration scoring algorithm may also include a semantic difference score. In certain embodiments, the transition score may incorporate the semantic difference score. Different embodiments may use different combinations of the scores to determine the configuration score for each configuration.

Some embodiments may place additional weight on certain scores (e.g., the semantic difference score, the base score). Certain embodiments may determine the weight placed on each of the scores by consulting a set of rules (e.g., rules 142 from FIG. 1).

In some embodiments, the base score, the preference score, and the transition score can be determined by a configuration scorer (e.g., configuration scorer 134 from FIG. 1) accessing rules (e.g., rules 142 from FIG. 1) or some data storage (e.g., a table such as a LUT). For example, in some embodiments, the value assigned for each mapping (e.g., a revenue dimension to value edge mapping in a bar chart, a revenue dimension to color edge mapping in a map) can also be found in a set of rules (rules 142 from FIG. 1) or a data storage (e.g., a table such as a LUT). The transition value from one visualization type to another type can also be found in a set of rules (rules 142 from FIG. 1) or a data storage (e.g., a table such as a LUT) in some embodiments. These scores can be pre-assigned by an administrator or a user of a visual analyzer system. The configuration algorithm may also be adjusted by the administrator or the user of the visual analyzer system (e.g., under a preference setting).

In this example, for the bar chart, the revenue to value mapping has a value of 10. The company location to category (x) mapping has a score of 7. The transition score from the bar chart to the bar chart can be given a value of 10. There is no preference score in this example. There is no additional weight placed on any of the scores in this example. The total configuration score for the this bar chart configuration is $(10 \times 1)+(7 \times 1)+10=27$.

For the map, the revenue to color mapping has a value of 5. The company location to a category (geo) mapping has a value of 30. The transition score from the bar chart to the map is 2. The total configuration score for this map configuration is $(5 \times 1)+(30 \times 1)+2=37$.

For the line chart, the revenue to value mapping has a value of 10. The company location to category mapping has a value of 7. The transition score from the bar chart to the line chart is 2. The total configuration score for this line chart configuration is $(10 \times 1)+(7 \times 1)+2=19$. The visual analyzer system may determine that the highest score is the most desired configuration. As such, in this example, the map configuration is selected.

V. Example Flow for Effectively Display One or More Dimensions in a New Visualization with a Different Visualization Type Compared to the Current Visualization A user may indicate a desire to change the presentation of dimensions of data from using one type of visualization to another type of visualization. For example, the user may specify the desire to switch a presentation of data using an existing visualization of a bar chart to one of a pie chart. Some embodiments can determine how to effectively display one or more dimensions of data in a new visualization where a new visualization type has been selected by the user. Certain embodiments may utilize a semantic distance algorithm to facilitate the mapping of edges (representing dimensions) in a first visualization of a first visualization type to edges in a second visualization of a second visualization type so that the new visualization appears intuitive to a user.

In some embodiments, a visual analyzer system can determine a mapping of the edges between the initial, existing, source visualization and the target visualization. Some embodiments perform a mapping by determining distances between the edges. In some embodiments, the distance between the edges is determined based on the tags associated with the edges. For example, an edge of a first visualization type that has a functional tag indicating that the edge is one that is suitable for representing names may have a short distance to an edge of a second visualization type that has a functional tag indicating that the edge is one that is suitable for representing company names.

Some embodiments follow a set of rules when transitioning a visualization from a first visualization type to one of a second visualization type. In some embodiments, the rules can include (1) showing something—some embodiments may move columns around so that the visualization is able to display something; and (2) keeping columns on edges that do the same thing—some embodiments may move columns to edges that behave similarly. Keeping columns on edges that do the same thing minimizes the semantic difference between the two visualizations. Some embodiments require for both rules to be met in order to allow the transition. In some embodiments, more weight is given to the first rule that requires the visualization to be able to render something. If there is a conflict between the two rules, some embodiments may only follow the first rule in ensuring that the visualization will be able to show something. In some embodiments, the set of rules can be stored in rules 142 in FIG. 1. A visual analyzer component such as edge distance determiner 112 from FIG. 1 may use these rules in determining how to map the edge values from edges of one visualization to the edges of another visualization.

Figure 9:
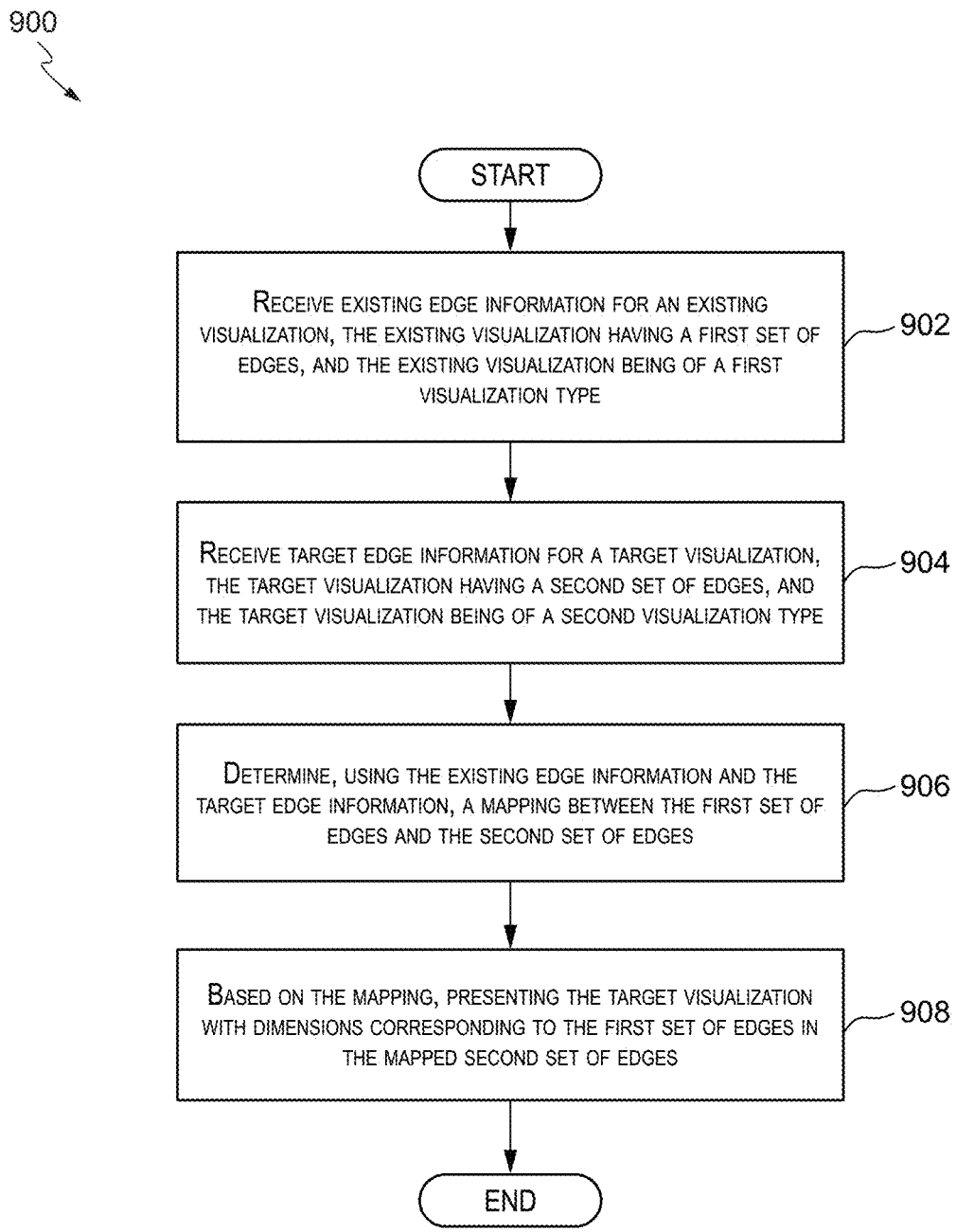
FIG. 9 illustrates an example process for converting a visualization of a first visualization type to another visualization of a second visualization type in accordance with some embodiments of the present invention.

FIG. 9 illustrates an example process 900 for converting a visualization of a first visualization type to another visualization of a second visualization type in accordance with some embodiments of the present invention. Some embodiments can go through each edge in a first, source visualization and determine where to map the value of the edge (also referred to as edge value, a data dimension or a column being represented by the edge) to an edge in a second, target visualization. In certain embodiments, a viz type distance determiner (such as viz type distance determiner 136 in FIG. 1) can perform a mapping analysis and map the values based on the distances between edges of the visualizations. The viz type distance determiner can determine, for each edge in the first, source visualization, the closest edge in the second, target visualization and map the information in the edge in the first, source visualization to the closest edge in the second, target visualization.

At block 902, process 900 can receive existing edge information for an existing visualization. The existing visualization can have a first set of edges. In some embodiments, the first set of edges corresponding to the existing visualization can identify a visualization type of the visualization. In this instance, the existing visualization is of a first visualization type.

At block 904, process 900 can receive edge information for a target visualization. The target visualization can have a second set of edges. In some embodiments, the target visualization can be of a second visualization type.

At block 906, process 900 can determine, using the existing edge information and the target edge information, a mapping between the first set of edges and the second set of edges. Some embodiments may select an edge from the first, source visualization and determine a closest edge from the new visualization.

The first visualization with first visualization type may have configuration information that includes 3 edges. The second visualization with a second visualization type may have configuration information that includes 4 edges. A viz type distance determiner can select a first edge in the first visualization and determine the closest edge from the second visualization. The value from the first edge in the first visualization may then be transferred to the closest edge in the second visualization. The viz type distance determiner may then go on to select a second edge and determine the closest edge from the second visualization, and so on, until all the edges have found matches.

Some embodiments may identify the edges in the target visualization that have been tagged as "required" edges and determine a match for these edges. In some embodiments, edges can have tags that identify whether an edge is or is not a "required" edge of a visualization. Some embodiments may first identify those edges that have been tagged as "required" for the visualization and fill the required ones before other edges of the visualization are filled.

In some embodiments, the distance between edges can be determined by comparing the tags associated with each edge. For instance, an edge with tags T1 and T2 and an edge with tags T1, T2, and T3 have 2 overlapping tags. The distance between these two edges may be smaller compared to edges with only 1 overlapping tag. The tag for each edge can identify characteristics of the edge. For instance, a tag for an edge can indicate whether the edge is a required edge or whether the edge accommodates geo-coordinates for its edge values. Based on the distances between the edges, the system can determine how to transfer the values from edges in one visualization to edges in another visualization.

In some embodiments, edges with matching identifiers would have a very small distance value. If the edge identifiers do not match, then a distance calculation is performed by determining the number of nodes to traverse in a hierarchical graph.

At block 908, process 900 can present, based on the mapping, the target visualization with dimensions corresponding to the first set of edges in the mapped second set of edges.

VI. Rules to Follow when Transitioning from a Viz of a First Type to a Viz of a Second Type As described, some embodiments follow a set of rules when transitioning a first visualization of a first visualization type to a second visualization of a second visualization type. In some embodiments, the rules can include one or more of showing something and/or keeping column on functionality of a similar edge.

Figure 10:
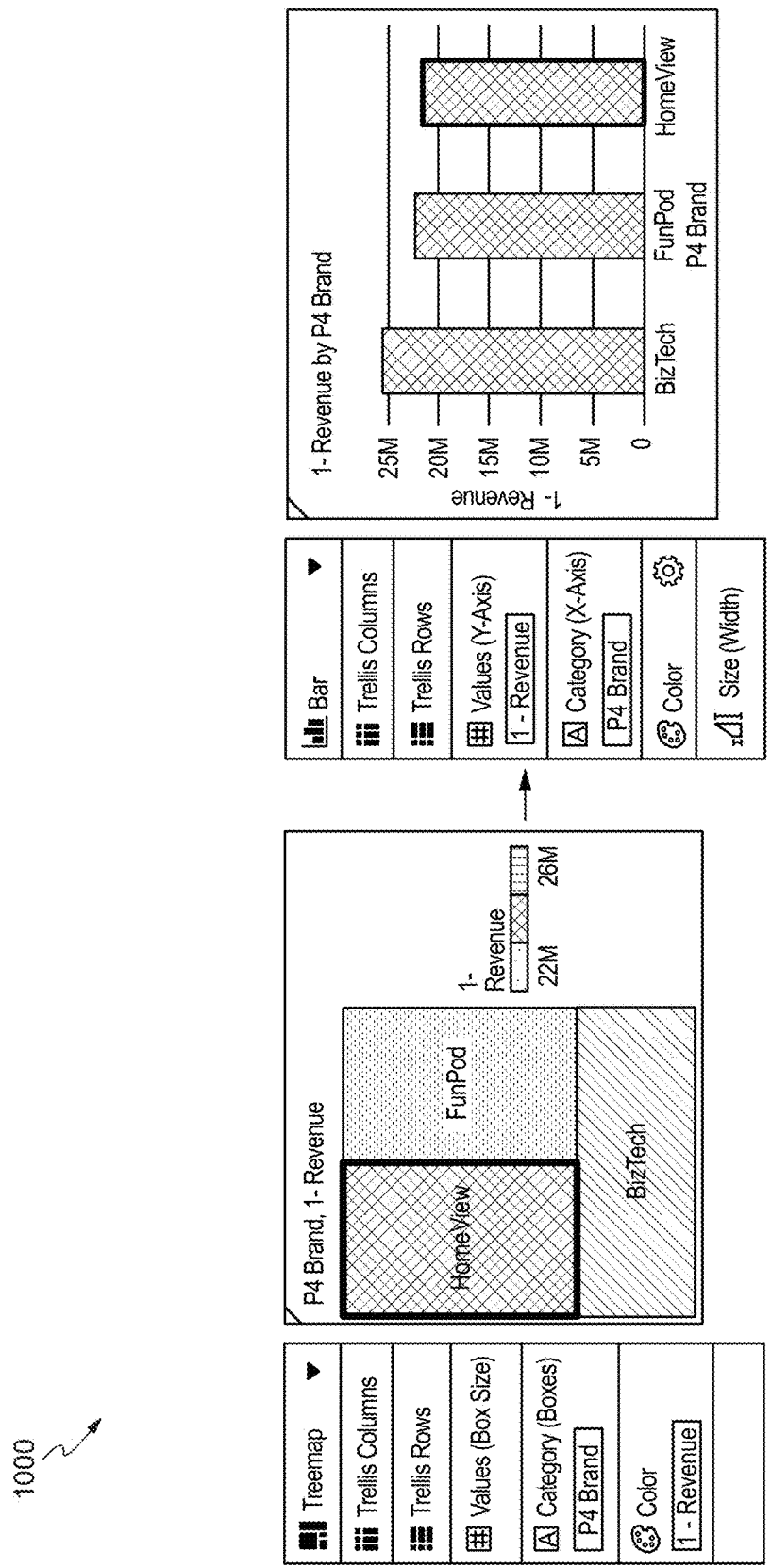
FIGS. 10 and 11 illustrate examples of rules to follow when transitioning from a visualization of a first type to a visualization of a second type in accordance with some embodiments of the present invention.

Some embodiments require the rule that the target visualization to be able to show something before the edge mapping is finalized. For example, a bar chart cannot show anything unless it has at least one measure-column in its "value" edge. So, as shown in FIG. 10, when transitioning from a treemap to a bar chart, the algorithm will move the measure "Revenue" from Color to Values so that the bar chart will show something.

Figure 11:
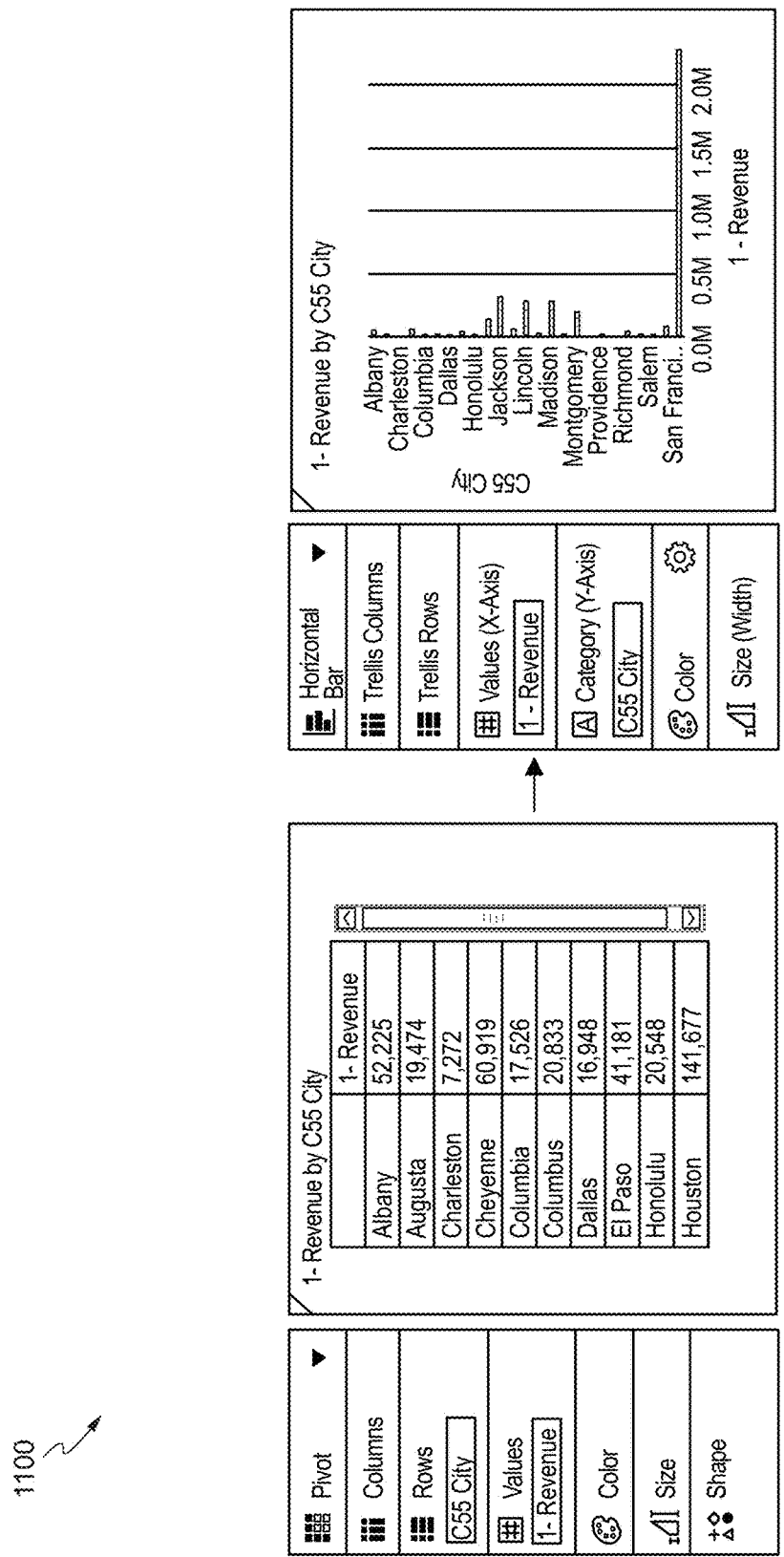

Certain embodiments may also require the rule to keep a column on a functionally similar edge. For example, even though both pivot and bar chart have a "Row" edge, when transitioning from a pivot table with "City" column in "Row," the algorithm prefers to move "City" column to the "Category" edge instead, because the "Category" edge on the bar chart was most functionally similar to the "Row" edge on a pivot table. As shown in FIG. 11, when transitioning from the pivot table to the horizontal bar chart, the "City" column has been moved from the "Row" edge in the pivot table to the "Category (y-axis)" edge in the bar chart.

VII. Process for Determining a Distance Between the Edges and a Mapping of a Value from One Edge to Another Edge Certain embodiments may map an edge from one visualization of a first visualization type to an edge in another visualization of a second visualization type based on a distance between the edges of the visualizations. Some embodiments may follow a set of rules such as the rules described above in FIGS. 10 and 11 when mapping the edges from one visualization to another. FIG. 12 illustrates the pseudo-code 1200 for mapping the edges from a source visualization to a target visualization in accordance with some embodiments of the present invention. Different embodiments may have variations in the rules to follow, the order in which the steps are performed, or the components that may be involved in performing the mapping between edges of the visualizations.

Some embodiments may compute an edge similarity between an edge of a first visualization (e.g., the source visualization) and an edge of a second visualization (e.g., the target visualization). In certain embodiments, computing an edge similarity between edges of the visualizations may enable the visual analyzer system to keep a column on a functionally similar edge. Different embodiments may determine how to keep a column on a functionally similar edge differently by implementing a different function.

In some embodiments, the edge similarity between the two edges can be determined based on the number of tags defined on both edges. As described, an edge of a visualization can have one or more tags associated with the edge where the tags define characteristics of the edge, such as the type of data (e.g., dimension, column) that can be represented by the edge. The edge similarity between two edges can be determined by determining a list of tags associated with the first edge and a list of tags associated with the second edge and then performing a comparison. In some embodiments, the tags that overlap in the two lists can indicate how similar the two edges are. For example, if there are 4 overlapping tags between two edges, these two edges are deemed to have a higher similarity value compared to two edges that only have 2 overlapping tags.

After determining the edge similarity values between the edges of the source and target visualizations, certain embodiments may then determine a sorted list of best matching edges. In some embodiments, for each edge in an array of edges to compare, an overall match score can be computed. In this example, the overall match score can be computed based on a similarity score and a priority score. In some embodiments, the similarity score can be computed using the algorithm described in the previous paragraph where the tags associated with the edges are compared to find the overlapping tags. In certain embodiments, the more overlapping tags, the higher the similarity score.

In some embodiments, the priority score can be computed based on an edge priority and a maximum priority. Each edge of a visualization may have a numerical priority. In some embodiments, the numerical priority can indicate the importance of the edge and/or whether the edge is a "required" edge or not. For example, an edge with a high priority among various edges can have a high numerical priority value and, in comparison to another edge with a lower priority, can have a higher numerical priority value. The maximum priority can be the maximum value of a priority across all edges. The priority score can be calculated by dividing a value of the edge priority by value of the maximum priority. If the edge is one with a highest priority in comparison to other edges, then the priority score may be 1. If the edge is one with a low priority in comparison to other edges, then the priority score may be a fraction of 1.

The overall match score can be a sum of the similarity score and the priority score. Some embodiments may determine an overall match score for each pair of edges and the sort the edge pairs based on their overall match scores. Certain embodiments may determine an array of edges (e.g., for each edge of the source visualization) that are sorted based on the overall match score of the edge pairs. In some embodiments, the array can have the edges (of the target visualization) sorted in an order from the best match to an edge (i.e., highest overall match score) to the least best match.

Some embodiments may map an edge on the first visualization (source visualization) to the second visualization (target visualization) by using the sorted list of best matching edges. In certain embodiments, traversing a sorted list of best matching edges and determining whether the edge can consume a column based on characteristics of the edge (e.g., tags associated with the edge) may enable the visual analyzer system to ensure that the target visualization is able to show something, thereby satisfying one of the required rules in some embodiments. Different embodiments may determine how to ensure that the target visualization can show something differently by implementing a different function.

As described, certain embodiments may traverse the sorted list of best matching edges and determine if the edge can accept the column (i.e., if the edge can consume the column data). Some embodiments can determine if an edge can accept a column based on characteristics of the edge. For example, if the edge is a value-type edge, the edge may not be able to accept a column that only has categorical-type values. In another example, if the edge is a categorical-type edge (e.g., color) that can only accept 7 categorical-type values, then the edge may not be able to accept a categorical-type column that has more than 7 dimension members. If the edge cannot accept the column, then the next edge from the sorted list is used. An edge may not be able to accept a column for example if that edge only supports a single column or if the types of data that can be represented by an edge does not include the type of data of the column (e.g., if the edge is a categorical-type edge and the column is a numerical-type column). As described, a functional tag of an edge can indicate the type of data (e.g., geographical information, location data) that the edge may be suitable for representing.

Figure 13:
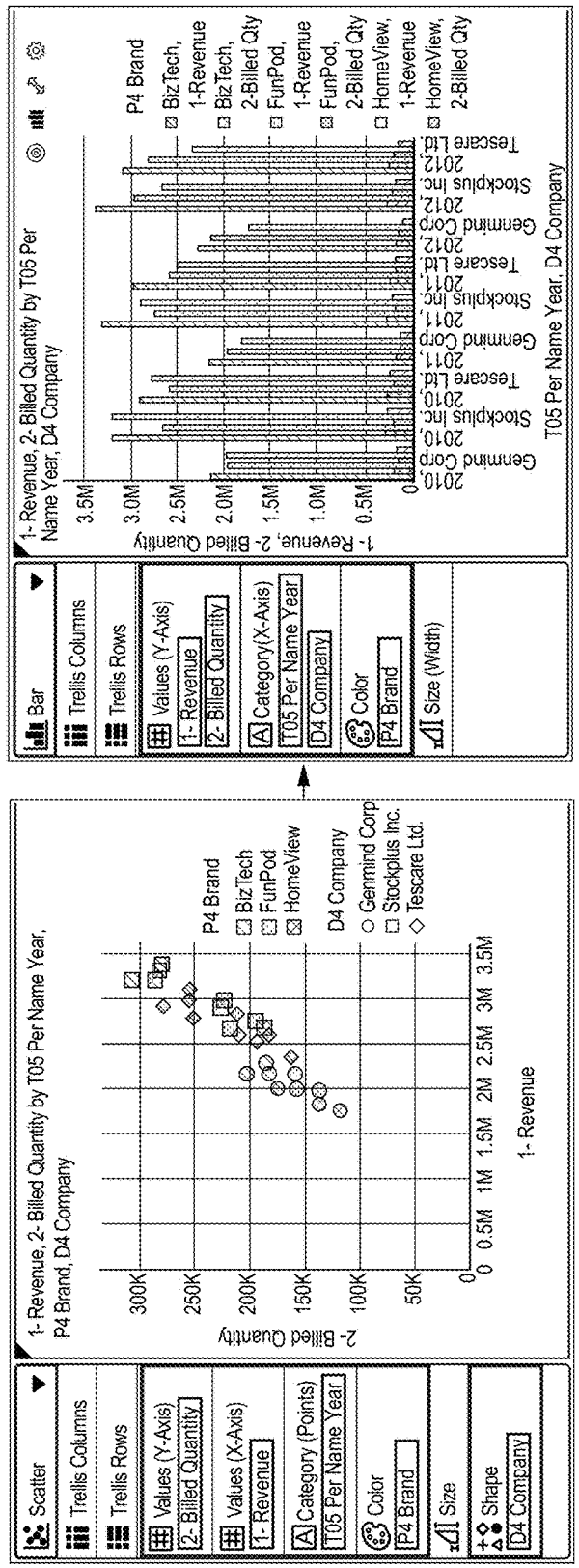
FIG. 13 illustrates screenshots for switching the display of a visualization representing one or more dimensions from a Scatterplot to a Bar Chart.

VIII. Example Screenshots for Switching the Display of a Visualization from a First Visualization Type to a Second Visualization Type FIG. 13 illustrates screenshots for switching the display of a visualization representing one or more dimensions from a Scatterplot to a Bar Chart. As shown, the "D4 company" dimension from "Shape" edge in Scatterplot has been moved to "Category" edge in the Bar Chart.

Figure 14:
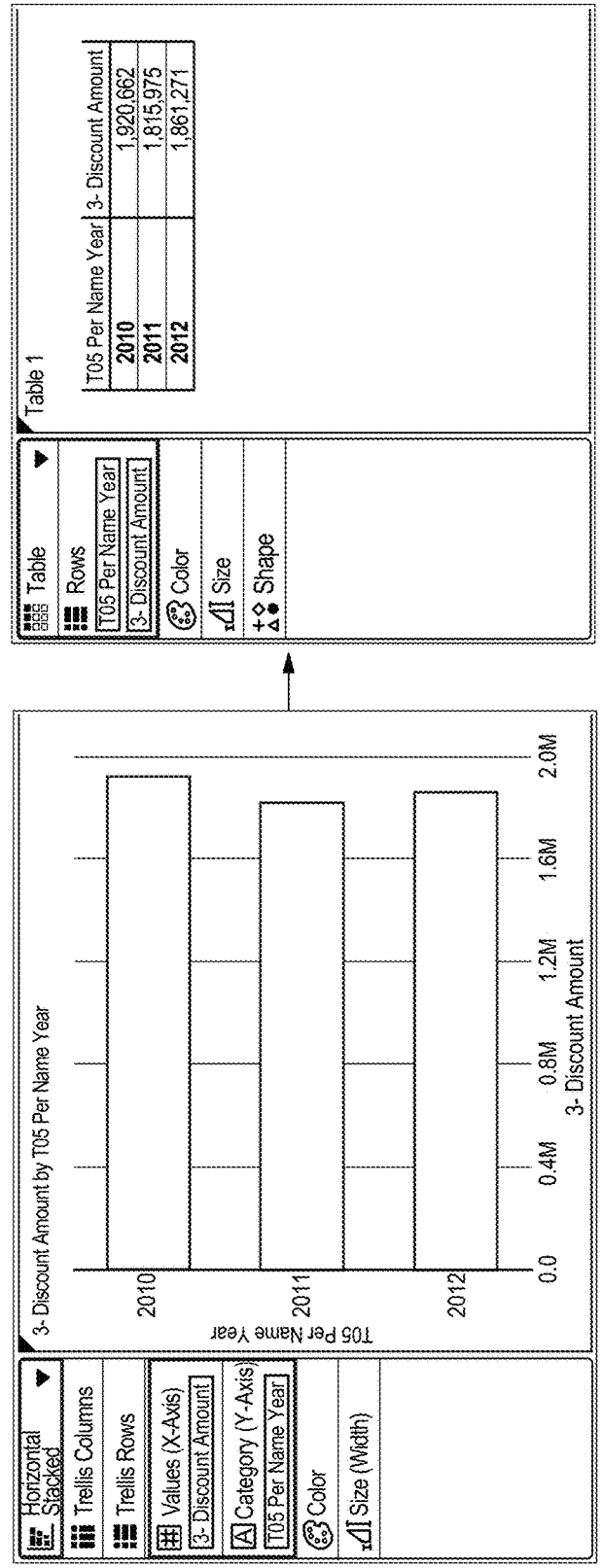
FIG. 14 illustrates screenshots for switching the display of a visualization representing one or more dimensions from a Horizontal Bar Chart to a Table.

FIG. 14 illustrates screenshots for switching the display of a visualization representing one or more dimensions from a Horizontal Bar Chart to a Table. As shown, the "Discount Amount" dimension and "Year" dimension have been moved to "Rows" edge because table does not support "Values" or "Category" edges.

Figure 15:
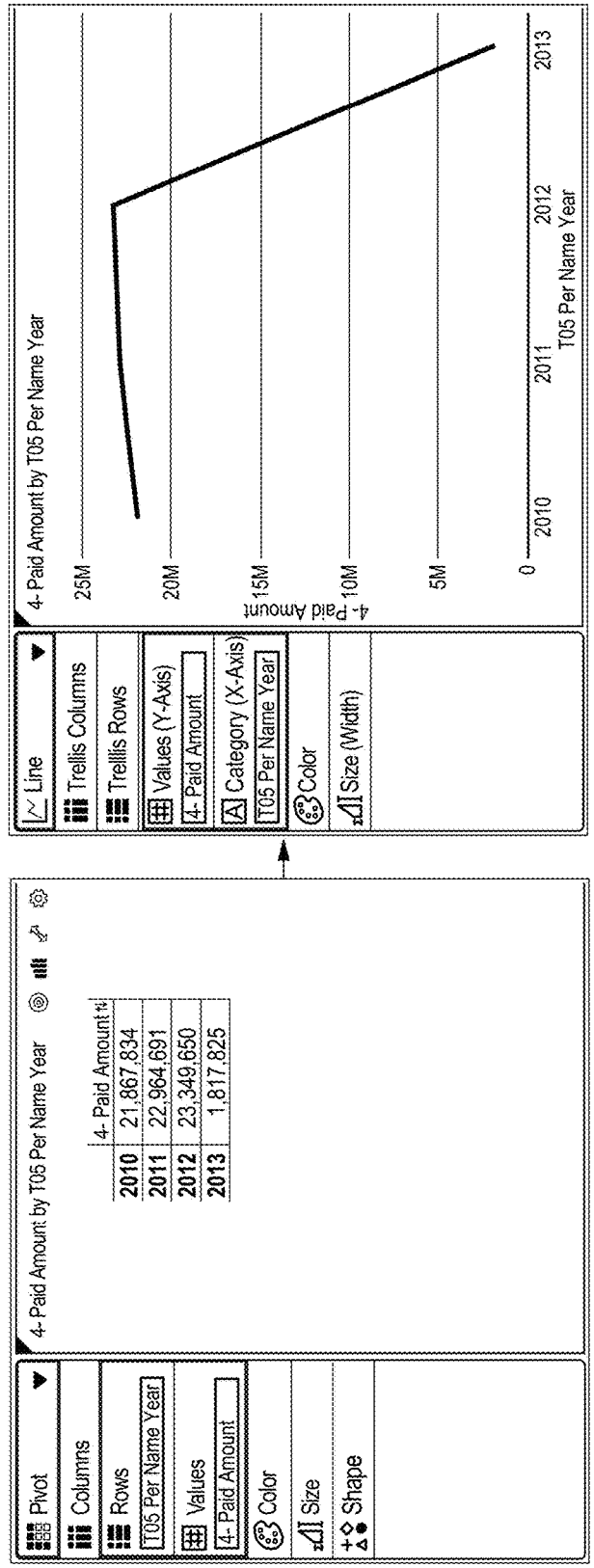
FIG. 15 illustrates screenshots for switching the display of a visualization representing one or more dimensions from a Pivot Chart to a Line Chart.
Figure 16:
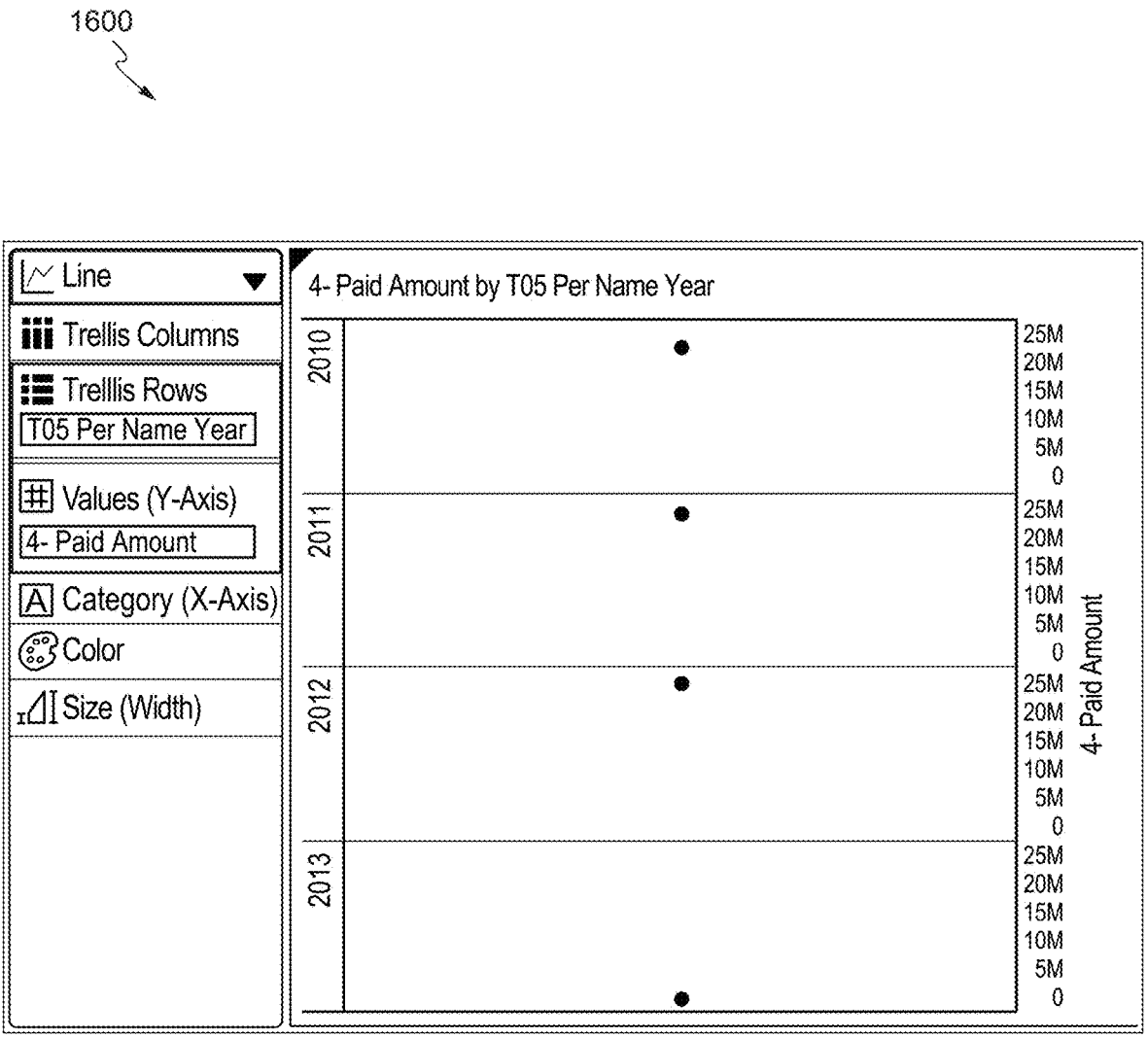
FIG. 16 illustrates a screenshot of switching the display of the visualization representing one or more dimensions from the Pivot Chart to the Line Chart where the best match logic was not used.

FIG. 15 illustrates screenshots for switching the display of a visualization representing one or more dimensions from a Pivot Chart to a Line Chart. As shown, some embodiments may move the "Year" dimension from "Rows" edge to "Category" edge because this was determined to be the best match. FIG. 16 illustrates a screenshot of switching the display of the visualization representing one or more dimensions from the Pivot Chart to the Line Chart where the best match logic was not used. This figure illustrates that when the best match logic is not used, the columns would be kept in the same edges (i.e., "Rows" edge to "Rows" edge) and the result would be less pleasing and more difficult for a user to read.

Figure 17:
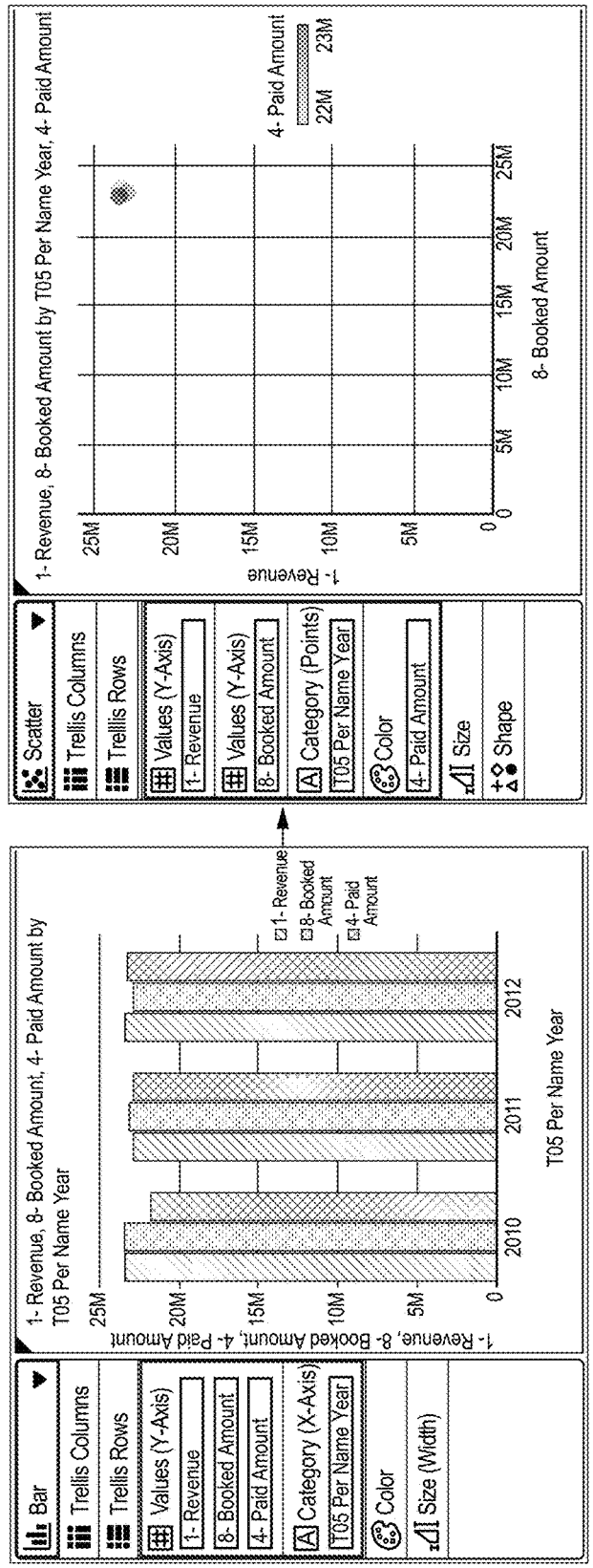
FIG. 17 illustrates screenshots for switching the display of a visualization representing one or more dimensions from a Bar Chart to a Scatterplot.

FIG. 17 illustrates screenshots for switching the display of a visualization representing one or more dimensions from a Bar Chart to a Scatterplot. Bar Charts allow unlimited number of columns in their "Values" edge. Scatter Charts only allow two columns in their "Values" edge. When transitioning from a Bar Chart with more than 2 columns in values to a Scatter Chart, the leftover columns may be placed into other edges that can accept them (e.g., "Color" edge in this instance).

IX. Example Distributed System

Figure 18:
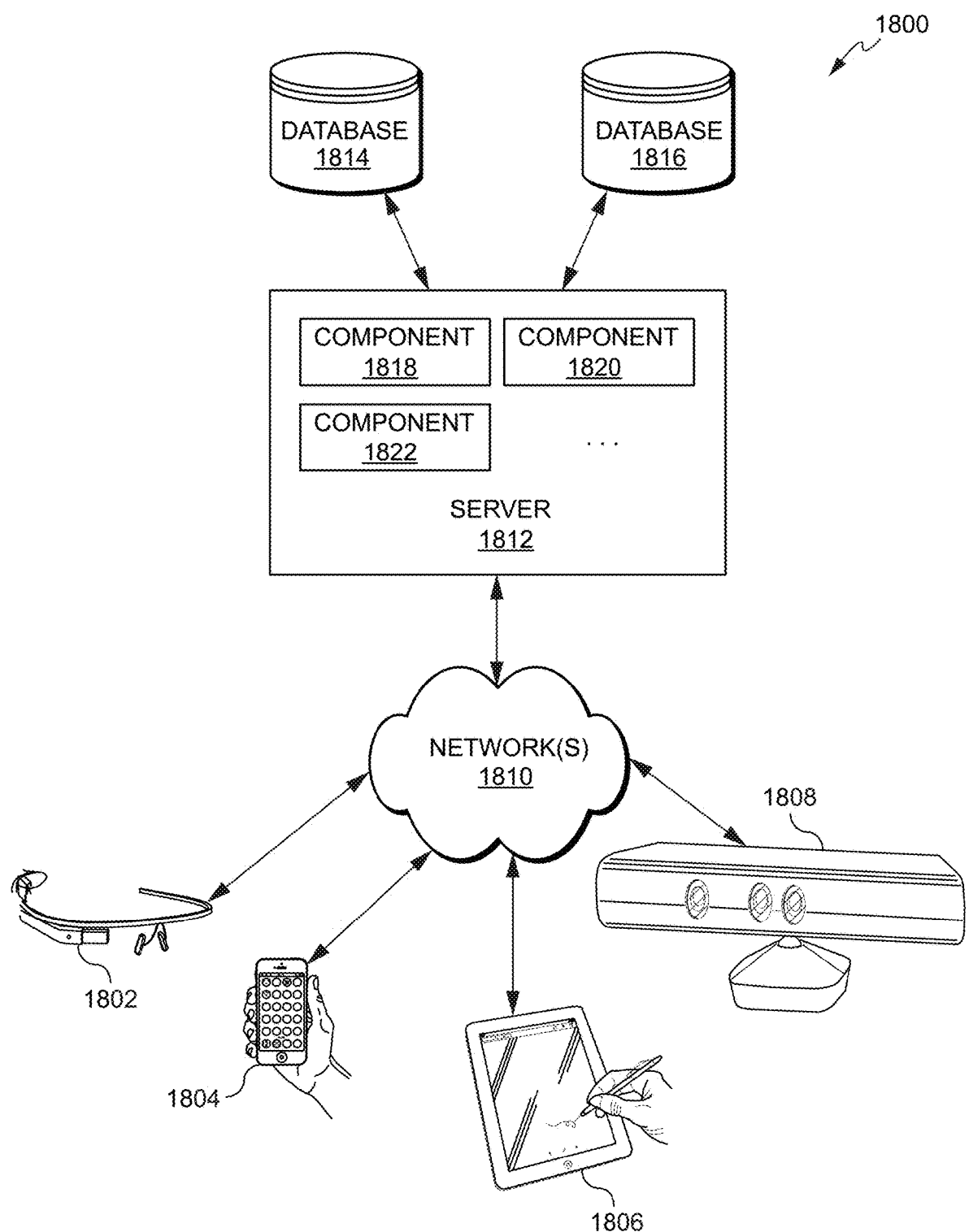
FIG. 18 depicts a simplified diagram of a distributed system for implementing an embodiment.

FIG. 18 depicts a simplified diagram of a distributed system 1800 for implementing an embodiment. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various embodiments, server 1812 may be adapted to run one or more services or software applications such as services and applications that provide the document (e.g., webpage) analysis and modification-related processing. In certain embodiments, server 1812 may also provide other services or software applications that can include non-virtual and virtual environments. In some embodiments, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in FIG. 18, software components 1818, 1820 and 1822 of system 1800 are shown as being implemented on server 1812. In other embodiments, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in FIG. 18 is thus one example of a distributed system for implementing an embodiment system and is not intended to be limiting.

Client computing devices 1802, 1804, 1806, and/or 1808 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 1810.

Although distributed system 1800 in FIG. 18 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1812 can include one or more virtual machines running virtual operating systems, or other computing architectures involving virtualization. One or more flexible pools of logical storage devices can be virtualized to maintain virtual storage devices for the server. Virtual networks can be controlled by server 1812 using software defined networking. In various embodiments, server 1812 may be adapted to run one or more services or software applications described in the foregoing disclosure. For example, server 1812 may correspond to a server for performing processing as described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. These databases may provide a mechanism for storing information such as user interactions information, usage patterns information, adaptation rules information, and other information used by embodiments of the present invention. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle, that are adapted to store, update, and retrieve data in response to SQL-formatted commands.

X. Example System Environment

Figure 19:
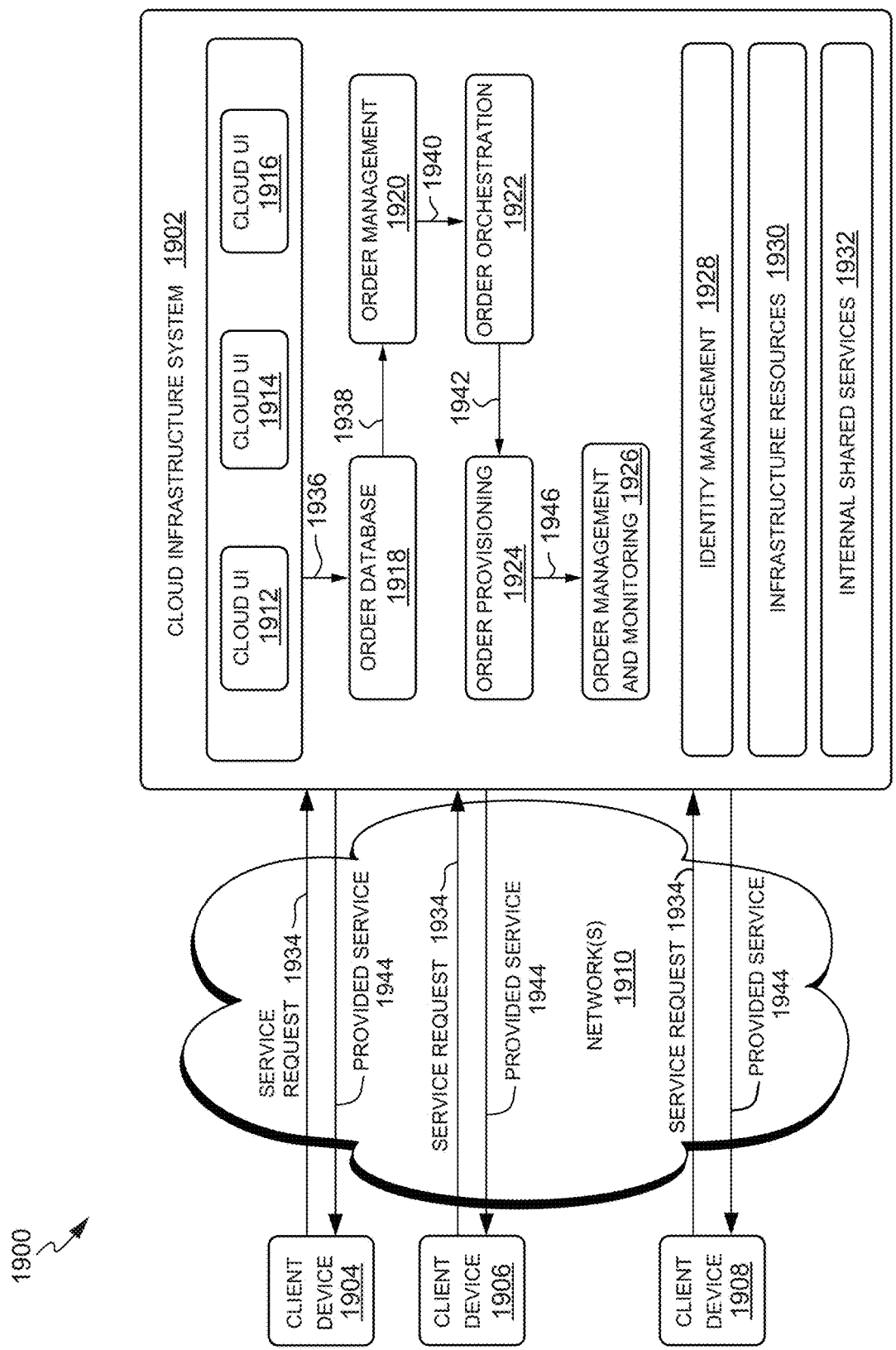
FIG. 19 is a simplified block diagram of one or more components of a system environment in which services may be offered as cloud services, in accordance with an embodiment of the present disclosure.

In some embodiments, the document analysis and modification services described above may be offered as services via a cloud environment. FIG. 19 is a simplified block diagram of one or more components of a system environment 1900 in which services may be offered as cloud services, in accordance with an embodiment of the present disclosure. In the illustrated embodiment in FIG. 19, system environment 1900 includes one or more client computing devices 1904, 1906, and 1908 that may be used by users to interact with a cloud infrastructure system 1902 that provides cloud services, including services for dynamically modifying documents (e.g., webpages) responsive to usage patterns. Cloud infrastructure system 1902 may comprise one or more computers and/or servers that may include those described above for server 1812.

It should be appreciated that cloud infrastructure system 1902 depicted in FIG. 19 may have other components than those depicted. Further, the embodiment shown in FIG. 19 is only one example of a cloud infrastructure system that may incorporate an embodiment of the invention. In some other embodiments, cloud infrastructure system 1902 may have more or fewer components than shown in the figure, may combine two or more components, or may have a different configuration or arrangement of components.

Client computing devices 1904, 1906, and 1908 may be devices similar to those described above for 1802, 1804, 1806, and 1808. Client computing devices 1904, 1906, and 1908 may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902. Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between clients 1904, 1906, and 1908 and cloud infrastructure system 1902. Each network may be any type of network familiar to those skilled in the art that can support data communications using any of a variety of commercially-available protocols, including those described above for network(s) 1810.

In certain embodiments, services provided by cloud infrastructure system 1902 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle Corporation) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some embodiments, the services provided by cloud infrastructure system 1902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some embodiments, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1902 may also include infrastructure resources 1930 for providing the resources used to provide various services to customers of the cloud infrastructure system. In one embodiment, infrastructure resources 1930 may include pre-integrated and optimized combinations of hardware, such as servers, storage, and networking resources to execute the services provided by the PaaS platform and the SaaS platform, and other resources.

In some embodiments, resources in cloud infrastructure system 1902 may be shared by multiple users and dynamically re-allocated per demand. Additionally, resources may be allocated to users in different time zones. For example, cloud infrastructure system 1902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1932 may be provided that are shared by different components or modules of cloud infrastructure system 1902 to enable provision of services by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1902, and the like.

In one embodiment, as depicted in FIG. 19, cloud management functionality may be provided by one or more modules, such as an order management module 1920, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In an exemplary operation, at 1934, a customer using a client device, such as client device 1904, 1906 or 1908, may interact with cloud infrastructure system 1902 by requesting one or more services provided by cloud infrastructure system 1902 and placing an order for a subscription for one or more services offered by cloud infrastructure system 1902. In certain embodiments, the customer may access a cloud User Interface (UI) such as cloud UI 1912, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

At 1936, the order information received from the customer may be stored in an order database 1918. If this is a new order, a new record may be created for the order. In one embodiment, order database 1918 can be one of several databases operated by cloud infrastructure system 1918 and operated in conjunction with other system elements.

At 1938, the order information may be forwarded to an order management module 1920 that may be configured to perform billing and accounting functions related to the order, such as verifying the order, and upon verification, booking the order.

At 1940, information regarding the order may be communicated to an order orchestration module 1922 that is configured to orchestrate the provisioning of services and resources for the order placed by the customer. In some instances, order orchestration module 1922 may use the services of order provisioning module 1924 for the provisioning. In certain embodiments, order orchestration module 1922 enables the management of business processes associated with each order and applies business logic to determine whether an order should proceed to provisioning.

As shown in the embodiment depicted in FIG. 19, at 1942, upon receiving an order for a new subscription, order orchestration module 1922 sends a request to order provisioning module 1924 to allocate resources and configure resources needed to fulfill the subscription order. Order provisioning module 1924 enables the allocation of resources for the services ordered by the customer. Order provisioning module 1924 provides a level of abstraction between the cloud services provided by cloud infrastructure system 1900 and the physical implementation layer that is used to provision the resources for providing the requested services. This enables order orchestration module 1922 to be isolated from implementation details, such as whether or not services and resources are actually provisioned on the fly or pre-provisioned and only allocated/assigned upon request.

At 1944, once the services and resources are provisioned, a notification may be sent to the subscribing customers indicating that the requested service is now ready for use. In some instance, information (e.g. a link) may be sent to the customer that enables the customer to start using the requested services.

At 1946, a customer's subscription order may be managed and tracked by an order management and monitoring module 1926. In some instances, order management and monitoring module 1926 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 1900 may include an identity management module 1928 that is configured to provide identity services, such as access management and authorization services in cloud infrastructure system 1900. In some embodiments, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.) Identity management module 1928 may also include the management of descriptive information about each customer and about how and by whom that descriptive information can be accessed and modified.

XI. Example Computer System

Figure 20:
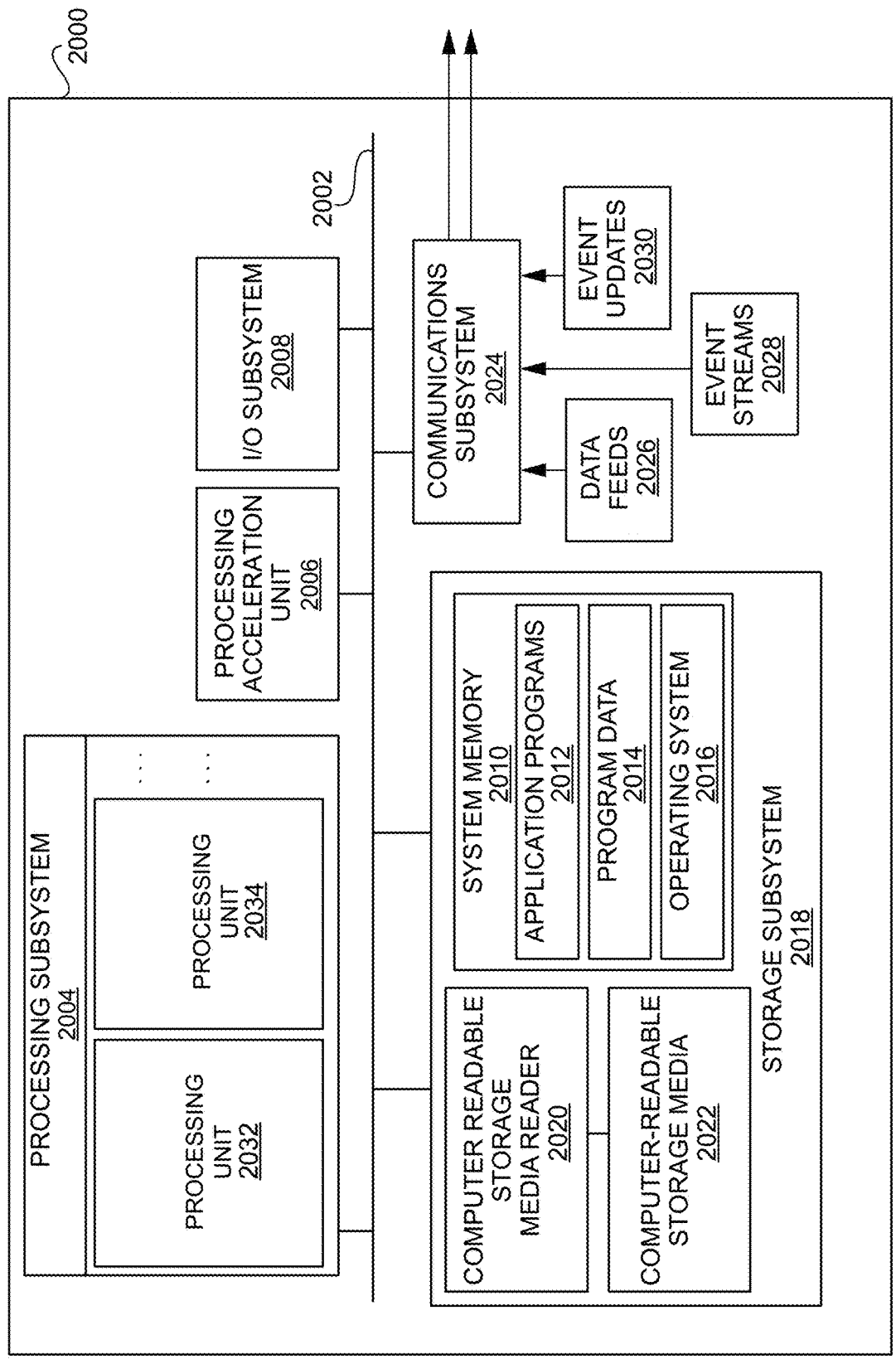
FIG. 20 illustrates an exemplary computer system that may be used to implement an embodiment of the present invention.

FIG. 20 illustrates an exemplary computer system 2000 that may be used to implement an embodiment of the present invention. In some embodiments, computer system 2000 may be used to implement any of the various servers and computer systems described above. As shown in FIG. 20, computer system 2000 includes various subsystems including a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 may include tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2004 controls the operation of computer system 2000 and may comprise one or more processing units 2032, 2034, etc. A processing unit may include be one or more processors, including single core or multicore processors, one or more cores of processors, or combinations thereof. In some embodiments, processing subsystem 2004 can include one or more special purpose co-processors such as graphics processors, digital signal processors (DSPs), or the like. In some embodiments, some or all of the processing units of processing subsystem 2004 can be implemented using customized circuits, such as application specific integrated circuits (ASICs), or field programmable gate arrays (FPGAs).

In some embodiments, the processing units in processing subsystem 2004 can execute instructions stored in system memory 2010 or on computer readable storage media 2022. In various embodiments, the processing units can execute a variety of programs or code instructions and can maintain multiple concurrently executing programs or processes. At any given time, some or all of the program code to be executed can be resident in system memory 2010 and/or on computer-readable storage media 2022 including potentially on one or more storage devices. Through suitable programming, processing subsystem 2004 can provide various functionalities described above for dynamically modifying documents (e.g., webpages) responsive to usage patterns.

In certain embodiments, a processing acceleration unit 2006 may be provided for performing customized processing or for off-loading some of the processing performed by processing subsystem 2004 so as to accelerate the overall processing performed by computer system 2000.

I/O subsystem 2008 may include devices and mechanisms for inputting information to computer system 2000 and/or for outputting information from or via computer system 2000. In general, use of the term "input device" is intended to include all possible types of devices and mechanisms for inputting information to computer system 2000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2018 provides a repository or data store for storing information that is used by computer system 2000. Storage subsystem 2018 provides a tangible non-transitory computer-readable storage medium for storing the basic programming and data constructs that provide the functionality of some embodiments. Software (programs, code modules, instructions) that when executed by processing subsystem 2004 provide the functionality described above may be stored in storage subsystem 2018. The software may be executed by one or more processing units of processing subsystem 2004. Storage subsystem 2018 may also provide a repository for storing data used in accordance with the present invention.

Storage subsystem 2018 may include one or more non-transitory memory devices, including volatile and non-volatile memory devices. As shown in FIG. 20, storage subsystem 2018 includes a system memory 2010 and a computer-readable storage media 2022. System memory 2010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2000, such as during start-up, may typically be stored in the ROM. The RAM typically contains data and/or program modules that are presently being operated and executed by processing subsystem 2004. In some implementations, system memory 2010 may include multiple different types of memory, such as static random access memory (SRAM) or dynamic random access memory (DRAM).

By way of example, and not limitation, as depicted in FIG. 20, system memory 2010 may store application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2022 may store programming and data constructs that provide the functionality of some embodiments. Software (programs, code modules, instructions) that, when executed by processing subsystem 2004 provides the functionality described above, may be stored in storage subsystem 2018. By way of example, computer-readable storage media 2022 may include non-volatile memory such as a hard disk drive, a magnetic disk drive, an optical disk drive such as a CD ROM, DVD, a Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2022 may provide storage of computer-readable instructions, data structures, program modules, and other data for computer system 2000.

In certain embodiments, storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for storing computer-readable information.

In certain embodiments, computer system 2000 may provide support for executing one or more virtual machines. Computer system 2000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2000. Accordingly, multiple operating systems may potentially be run concurrently by computer system 2000. Each virtual machine generally runs independently of the other virtual machines.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to establish a communication channel to one or more client devices via the Internet for receiving and sending information from and to the client devices. For example, visual analyzer system 102 depicted in FIG. 1 may receive user interactions information and webpage requests from client devices using communication subsystem 2024. Additionally, communication subsystem 2024 may be used to communicate webpages from adaptive visual analyzer system 102 to the requesting clients.

Communication subsystem 2024 may support both wired and/or wireless communication protocols. For example, in certain embodiments, communications subsystem 2024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

Communication subsystem 2024 can receive and transmit data in various forms. For example, in some embodiments, communications subsystem 2024 may receive input communication in the form of structured and/or unstructured data feeds 2026, event streams 2028, event updates 2030, and the like. For example, communications subsystem 2024 may be configured to receive (or send) data feeds 2026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2024 may be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2000 depicted in FIG. 20 is intended only as a specific example. Many other configurations having more or fewer components than the system depicted in FIG. 20 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving, by a computing device, existing edge information for an existing visualization;
   receiving, by the computing device, target edge information for a target visualization;
   determining, by the computing system, using the existing edge information and the target edge information, a mapping between a first set of edges of the existing visualization and a second set of edges of the target visualization based on distances between edges from the first set of edges and edges from the second set of edges; and
   presenting, by the computing system, the target visualization with dimensions corresponding to the first set of edges in the second set of edges based at least on the mapping.

2. The method of claim 1, wherein the first set of edges identify a visualization type of the existing visualization, and the existing visualization is a first visualization type.

3. The method of claim 2, wherein the second set of edges identify a visualization type of the target visualization, and the target visualization is a second visualization type.

4. The method of claim 1, wherein the distances are determined by determining an edge similarity score between each of the first set of edges and each of the second set of edges.

5. The method of claim 4, wherein each edge of the first set of edges is associated with a list of tags that define characteristics of each respective edge of the first set of edges, each edge of the second set of edges is associated with a list of tags that define characteristics of each respective edge of the second set of edges, and the edge similarity score between each of the first set of edges and each of the second set of edges is determined based on a number of overlapping tags between each tag within the list of tags of each respective edge of the first set of edges and each tag within the list of tags of each respective edge of the second set of edges.

6. The method of claim 5, wherein the distances are further determined by determining a priority score for each of the first set of edges, wherein the priority score is computed based on a numerical edge priority assigned to each of the first set of edges, and a maximum priority across all edges of the first set of edges.

7. The method of claim 6, wherein the distances are further determined by computing an overall match score between each of the first set of edges and each of the second set of edges based on the edge similarity score and the priority score.

8. A system comprising:
one or more processors; and
memory coupled to the one or more processors, the memory encoded with a set of instructions configured to perform a process comprising:
receiving existing edge information for an existing visualization;
receiving target edge information for a target visualization;
determining, using the existing edge information and the target edge information, a mapping between a first set of edges of the existing visualization and a second set of edges of the target visualization based on distances between edges from the first set of edges and edges from the second set of edges; and
presenting the target visualization with dimensions corresponding to the first set of edges in the second set of edges based at least on the mapping.

9. The system of claim 8, wherein the first set of edges identify a visualization type of the existing visualization, and the existing visualization is a first visualization type.

10. The system of claim 9, wherein the second set of edges identify a visualization type of the target visualization, and the target visualization is a second visualization type.

11. The system of claim 8, wherein the distances are determined by determining an edge similarity score between each of the first set of edges and each of the second set of edges.

12. The system of claim 11, wherein each edge of the first set of edges is associated with a list of tags that define characteristics of each respective edge of the first set of edges, each edge of the second set of edges is associated with a list of tags that define characteristics of each respective edge of the second set of edges, and the edge similarity score between each of the first set of edges and each of the second set of edges is determined based on a number of overlapping tags between each tag within the list of tags of each respective edge of the first set of edges and each tag within the list of tags of each respective edge of the second set of edges.

13. The system of claim 12, wherein the distances are further determined by determining a priority score for each of the first set of edges, wherein the priority score is computed based on a numerical edge priority assigned to each of the first set of edges and a maximum priority across all edges of the first set of edges.

14. The system of claim 13, wherein the distances are further determined by computing an overall match score between each of the first set of edges and each of the second set of edges based on the edge similarity score and the priority score.

15. A non-transitory computer readable storage medium storing instructions that, when executed by one or more processors of a computing device, cause the computing device to perform operations comprising:
receiving existing edge information for an existing visualization;
receiving target edge information for a target visualization;
determining, using the existing edge information and the target edge information, a mapping between a first set of edges of the existing visualization and a second set of edges of the target visualization based on distances between edges from the first set of edges and edges from the second set of edges; and
presenting the target visualization with dimensions corresponding to the first set of edges in the second set of edges based at least on the mapping.

16. The non-transitory computer readable storage medium of claim 15, wherein the first set of edges identify a visualization type of the existing visualization, and the existing visualization is a first visualization type, and the second set of edges identify a visualization type of the target visualization, and the target visualization is a second visualization type.

17. The non-transitory computer readable storage medium of claim 15, wherein the distances are determined by determining an edge similarity score between each of the first set of edges and each of the second set of edges.

18. The non-transitory computer readable storage medium of claim 17, wherein each edge of the first set of edges is associated with a list of tags that define characteristics of each respective edge of the first set of edges, each edge of the second set of edges is associated with a list of tags that define characteristics of each respective edge of the second set of edges, and the edge similarity score between each of the first set of edges and each of the second set of edges is determined based on a number of overlapping tags between each tag within the list of tags of each respective edge of the first set of edges and each tag within the list of tags of each respective edge of the second set of edges.

19. The non-transitory computer readable storage medium of claim 18, wherein the distances are further determined by determining a priority score for each of the first set of edges, wherein the priority score is computed based on a numerical edge priority assigned to each of the first set of edges and a maximum priority across all edges of the first set of edges.

20. The non-transitory computer readable storage medium of claim 19, wherein the distances are further determined by computing an overall match score between each of the first set of edges and each of the second set of edges based on the edge similarity score and the priority score.

* * * * *